US010913463B2

(12) United States Patent
Herz et al.

(10) Patent No.: US 10,913,463 B2
(45) Date of Patent: Feb. 9, 2021

(54) GESTURE BASED CONTROL OF AUTONOMOUS VEHICLES

(71) Applicant: Apple Inc., Cupertino, CA (US)

(72) Inventors: Scott M. Herz, Santa Clara, CA (US); Karlin Bark, Menlo Park, CA (US); Nguyen-Cat Le, San Jose, CA (US)

(73) Assignee: Apple Inc., Cupertino, CA (US)

( * ) Notice: Subject to any disclaimer, the term of this patent is extended or adjusted under 35 U.S.C. 154(b) by 193 days.

(21) Appl. No.: 15/709,389

(22) Filed: Sep. 19, 2017

(65) Prior Publication Data

US 2018/0079427 A1    Mar. 22, 2018

Related U.S. Application Data

(60) Provisional application No. 62/397,805, filed on Sep. 21, 2016.

(51) Int. Cl.
*B60W 50/10* (2012.01)
*G06F 3/16* (2006.01)
(Continued)

(52) U.S. Cl.
CPC .............. *B60W 50/10* (2013.01); *B60K 35/00* (2013.01); *B60Q 1/34* (2013.01); *B60W 50/14* (2013.01); *G05D 1/0016* (2013.01); *G05D 1/0088* (2013.01); *G05D 1/0246* (2013.01); *G06F 3/013* (2013.01); *G06F 3/017* (2013.01); *G06F 3/0482* (2013.01); *G06F 3/167* (2013.01); *B60K 2370/146* (2019.05); *B60K 2370/148* (2019.05); *B60K 2370/1531* (2019.05); *B60K 2370/334* (2019.05); *B60K 2370/77* (2019.05);
(Continued)

(58) Field of Classification Search
CPC ....... B60W 50/10; B60W 50/08; B60K 35/00; B60Q 1/34; G05D 1/0016; G05D 1/008; G06F 3/012; G06F 3/013
USPC .......................................................... 701/24
See application file for complete search history.

(56) References Cited

U.S. PATENT DOCUMENTS 6,240,303 B1    5/2001    Katzur
6,411,926 B1    6/2002    Chang
(Continued)

FOREIGN PATENT DOCUMENTS

DE    10045616        3/2002
DE    102012007984    3/2013
(Continued)

OTHER PUBLICATIONS

U.S. Appl. No. 15/826,486, filed Nov. 29, 2017, Scott M. Hertz, et al.
(Continued)

*Primary Examiner* — Krishnan Ramesh
(74) *Attorney, Agent, or Firm* — Robert C. Kowert; Kowert, Hood, Munyon, Rankin & Goetzel, P.C.

(57) ABSTRACT

A triggering condition for initiating an interaction session with an occupant of a vehicle is detected. A display is populated with representations of one or more options for operations associated with the vehicle. Based at least in part on an analysis of one or more signals generated by the occupant, a particular option is selected for implementation. An indication that the particular option has been selected is provided, and an operation corresponding to the particular option is initiated.

19 Claims, 11 Drawing Sheets

(51) Int. Cl.
*G05D 1/02* (2020.01)
*B60W 50/14* (2020.01)
*B60K 35/00* (2006.01)
*B60Q 1/34* (2006.01)
*G06F 3/0482* (2013.01)
*G06F 3/01* (2006.01)
*G05D 1/00* (2006.01)

(52) U.S. Cl.
CPC ... *B60W 2050/146* (2013.01); *B60W 2540/00* (2013.01); *B60W 2540/21* (2020.02); *B60W 2720/106* (2013.01); *B60W 2720/24* (2013.01); *G05D 2201/0213* (2013.01)

(56) References Cited

U.S. PATENT DOCUMENTS

| | | | |
|---|---|---|---|
| 6,804,396 | B2 | 10/2004 | Higaki et al. |
| 7,000,200 | B1 | 2/2006 | Martins |
| 7,274,800 | B2 | 9/2007 | Nefian et al. |
| 7,394,346 | B2 | 7/2008 | Bodin |
| 7,672,845 | B2 | 3/2010 | Beranek et al. |
| 8,346,426 | B1 * | 1/2013 | Szybalski ............ B60W 50/14 701/28 |
| 9,639,994 | B2 | 5/2017 | Beaurepaire |
| 9,950,711 | B2 * | 4/2018 | Kleen ................. B60W 50/14 |
| 2013/0030811 | A1 | 1/2013 | Olleon et al. |
| 2013/0138591 | A1 * | 5/2013 | Ricci ...................... H04W 4/90 706/46 |
| 2013/0307771 | A1 | 11/2013 | Parker et al. |
| 2014/0223384 | A1 * | 8/2014 | Graumann .............. G06F 3/012 715/863 |
| 2014/0237366 | A1 | 8/2014 | Poulos et al. |
| 2014/0361973 | A1 | 12/2014 | Raux et al. |
| 2014/0365228 | A1 * | 12/2014 | Ng-Thow-Hing ..... G02B 27/01 704/275 |
| 2015/0100179 | A1 * | 4/2015 | Alaniz ................... A63F 13/00 701/1 |
| 2015/0348112 | A1 * | 12/2015 | Ramanujam ....... G06Q 30/0266 705/14.63 |
| 2016/0125736 | A1 | 5/2016 | Shaik |
| 2016/0167648 | A1 | 6/2016 | James et al. |
| 2018/0052458 | A1 * | 2/2018 | Tsuji .................... B60W 50/14 |
| 2018/0074497 | A1 * | 3/2018 | Tsuji ................. G06K 9/00288 |
| 2018/0345994 | A1 * | 12/2018 | Goerick ................ B60K 35/00 |

FOREIGN PATENT DOCUMENTS

| | | |
|---|---|---|
| EP | 3007036 A1 | 4/2016 |
| WO | 20150106867 | 7/2015 |
| WO | 2015198769 A1 | 12/2015 |

OTHER PUBLICATIONS

Invitation to Pay Additional Fees from PCT/US2017/052583, dated Dec. 15, 2017, Apple Inc., pp. 1-18.
International Search Report and Written Opinion From PCT/US2017/052583, dated Feb. 6, 2018, Apple Inc., pp. 1-24.
Andrew Wilson, et al., "XWand: UI for Intelligent Spaces," In Proceedings of the SIGCHI conference on Human factors in computing systems (pp. 545-552). ACM.
Linda E. Sibert, et al., "Evaluation of Eye Gaze Interaction," Proceedings of the SIGCHI conference on Human Factors in Computing Systems, pp. 281-288 Apr. 1, 2000, ACM.
David Droeschel, et al., "Learning to Interpret Pointing Gestures with a Time-of-Flight Camera," 2011 6th ACM/IEEE International Conference on Human-Robot Interaction (HRI), pp. 481-488.
Yang-Lei Zhao, et al, "Pointing at Responsive Objects Outdoors," In Proceedings of the 2012 ACM international conference on Intelligent User Interfaces (pp. 281-284). ACM.
Andy Lücking, et al. "Pointing andreferencereconsidered," ScienceDirect, Journal of Pragmatics 77 (2015) pp. 56-79.
Takehiko Ohno, et al, "Gaze-Based Interaction for Anyone, Anytime," In Proceedings of HCI International 2003 (vol. 4, pp. 1452-1456).
Richard A. Bolt, ""Put-That-There": Voice and Gesture at the Graphics Interface," 1980 ACM, (vol. 14, No. 3, pp. 262-270). ACM.
Boris Schauerte, et al. ""Look at this!" Learning to Guide Visual Saliency in Human-Robot Interaction," In Intelligent Robots and Systems (IROS 2014), 2014 IEEE/RSJ International Conference on (pp. 995-1002). IEEE.
Rümelin, S., Marouane, C., & Butz, A. (Oct. 2013). Free-hand pointing for identification and interaction with distant objects. In Proceedings of the 5th International Conference on Automotive User Interfaces and Interactive Vehicular Applications (pp. 40-47). ACM.
Nickel, K., & Stiefelhagen, R. (Nov. 2003). Pointing gesture recognition based on 3D-tracking of face, hands and head orientation. In Proceedings of the 5th international conference on Multimodal interfaces (pp. 140-146). ACM.
U.S. Appl. No. 15/676,921, filed Aug. 14, 2017, Wolf Kienzle.
Udara E. Manawadu et al "A hand gesture based driver-vehicle interface to control lateral and longitudinal motions of an autonomous vehicle", 2016 IEEE International Conference on Systems, Man, and Cybernetics (SMC), dated Oct. 9, 2016, pp. 1785-1790.

* cited by examiner

GESTURE BASED CONTROL OF AUTONOMOUS VEHICLES

BACKGROUND

This application claims benefit of priority to U.S. Provisional Application No. 62/397,805, filed Sep. 21, 2016, titled "Gesture Based Control Of Autonomous Vehicles," which is hereby incorporated by reference in its entirety.

Technical Field

This disclosure relates generally to systems and algorithms for using gestures and other occupant-generated signals for controlling the motion of autonomous or partially autonomous vehicles.

Description of the Related Art

Motorized vehicles which are capable of sensing their environment and navigating to destinations with little or no ongoing input from occupants, and may therefore be referred to as "autonomous" or "self-driving" vehicles, are an increasing focus of research and development. Given the multiplicity of choices that are typically available with respect to vehicle trajectories in real-world environments, occupant input or guidance with regard to selecting vehicle trajectories (without requiring traditional steering, braking, accelerating and the like) may be extremely valuable to the motion control components of such vehicles. However, providing interfaces for such guidance which are intuitive and easy to use may present a non-trivial challenge.

SUMMARY OF EMBODIMENTS

Various embodiments of methods and apparatus for gesture based control of autonomous or semi-autonomous vehicles are described. In at least some embodiments, a method may comprise one or more computing devices detecting that a triggering condition has been met for initiation of a gesture-based interaction session with respect to an occupant of a vehicle. Detecting that the triggering condition has been met may itself comprise analyzing or matching a particular hand or body gesture made by the individual within an interaction zone (a three-dimensional region near the occupant, whose boundaries may be customizable) in some embodiments. Other modes of initiating an interaction session, such as using a voiced command, may be used in other embodiments, and combinations of signals of different modalities (e.g., voice, gesture, gaze direction etc.) may be used in some embodiments. The method may further comprise identifying one or more options for operations associated with the vehicle, which may be of interest to the occupant participating in the session. A wide variety of options for operations may be identified in different embodiments, including for example passing another vehicle, accelerating the vehicle, decelerating the vehicle, parking the vehicle, changing a direction in which the vehicle is moving, or generating a signal detectable outside the vehicle. At least some of the options may be identified based at least in part on the analysis of signals collected from the external environment of the vehicle— e.g., using one or more cameras or other sensors. For example, based on the location of the vehicle and the views of the external environment, options to park the vehicle near a particular building such as a restaurant or a retail store, to turn the vehicle onto another road, to enter or exit a highway on-ramp, etc., may be identified.

The method may include populating a display with respective representations of at least some of the options. In some cases, the options identified may be assigned respective interest scores or relevance scores based for example on contextual information (such as the time of day, the status of various components of the vehicle such as the gas tank or battery, and so on), personal profiles or preferences of the occupant, and the like. From among a plurality of options identified, representations of a subset (selected for example based on the scores) may be displayed at least initially; additional options may be displayed if the first subset does not include the option the occupant wishes to have implemented. Based at least in part on an analysis of a particular gesture made by the occupant (e.g., a swiping gesture within the interaction zone, or some other type of displacement of a hand within the interaction zone), and/or some other signal from the occupant, a particular option of the one or more options may be selected for implementation. An indication of the particular option which was selected may be provided (e.g., by highlighting the representation of that option on the display), and an operation corresponding to the particular option may be initiated. In some embodiments, after the selection is indicated to the occupant, another gesture or signal confirming or approving the selected option may be required before the corresponding operation is initiated.

A variety of displays may be used in different embodiments, such as a heads-up display incorporated within or attached to the vehicle, a three-dimensional display, a display of a wearable device (such as an augmented reality headset or eyeglasses) being worn by the occupant, a television screen, or a display of a portable computing device. In some embodiments, options for operations associated with the vehicle may be identified even during time periods when an interaction session is not in progress. In some such embodiments, a greyed-out or de-emphasized representation of the options may be provided on the display unless an interaction session has been started; once a session is underway, enhanced representations of the options may be displayed instead of de-emphasized representations. The indication that the particular option has been selected may comprise, for example, one or more of: highlighting a representation of the particular option on the display, providing an audio message, or displaying a text string. Interaction sessions may be explicitly terminated using additional gestures or signals in various embodiments. When a session is not in progress, tracking and/or analysis of at least some of the signals generated by the occupant may not be performed in various embodiments.

In some embodiments, the relative positioning of the representations of the options on the display may be based at least in part on the relative spatial locations of corresponding entities in the external environment. For example, if parking at a department store on the left side of a road is one option which is identified for a vehicle, and parking at a gas station on the right side of the road is another option, the representation of the department store option may be placed to the left of the representation of the gas station option on the display.

According to some embodiments, a system may comprise one or more sensor devices and one or more interaction management devices. The interaction management devices may detect, based at least in part on data collected at the one or more sensor devices, that a triggering condition has been met for initiation of a gesture-based interaction session with respect to an occupant of a vehicle. A set of options corresponding to operations associated with the vehicle, such as several possible changes to the trajectory of the vehicle, may be identified. Representations of at least some of the options may be provided via a display to the occupant. Based at least in part on analysis of a particular gesture made by the occupant, detected using data collected at the one or more sensor devices, a particular option of the one or more options may be selected for implementation. An indication that the particular option has been selected may be provided to the occupant, and the operation corresponding to the particular option may be initiated.

According to another embodiment, a non-transitory computer-accessible storage medium may store program instructions that when executed on one or more processors detect that a triggering condition has been met for initiation of a gesture-based interaction session with respect to an occupant of a vehicle. One or more options corresponding to operations associated with the vehicle may be identified. A display may be populated with representations of at least some of the options. Based at least in part on analysis of a particular gesture or some other signal obtained from the occupant, one of the options may be selected for implementation. An indication of the selection may be provided to the occupant, and the operation corresponding to the particular option may be initiated.

While embodiments are described herein by way of example for several embodiments and illustrative drawings, those skilled in the art will recognize that embodiments are not limited to the embodiments or drawings described. It should be understood, that the drawings and detailed description thereto are not intended to limit embodiments to the particular form disclosed, but on the contrary, the intention is to cover all modifications, equivalents and alternatives falling within the spirit and scope as defined by the appended claims. The headings used herein are for organizational purposes only and are not meant to be used to limit the scope of the description or the claims. As used throughout this application, the word "may" is used in a permissive sense (i.e., meaning having the potential to), rather than the mandatory sense (i.e., meaning must). Similarly, the words "include," "including," and "includes" mean including, but not limited to. When used in the claims, the term "or" is used as an inclusive or and not as an exclusive or. For example, the phrase "at least one of x, y, or z" means any one of x, y, and z, as well as any combination thereof.

DETAILED DESCRIPTION

Figure 1:
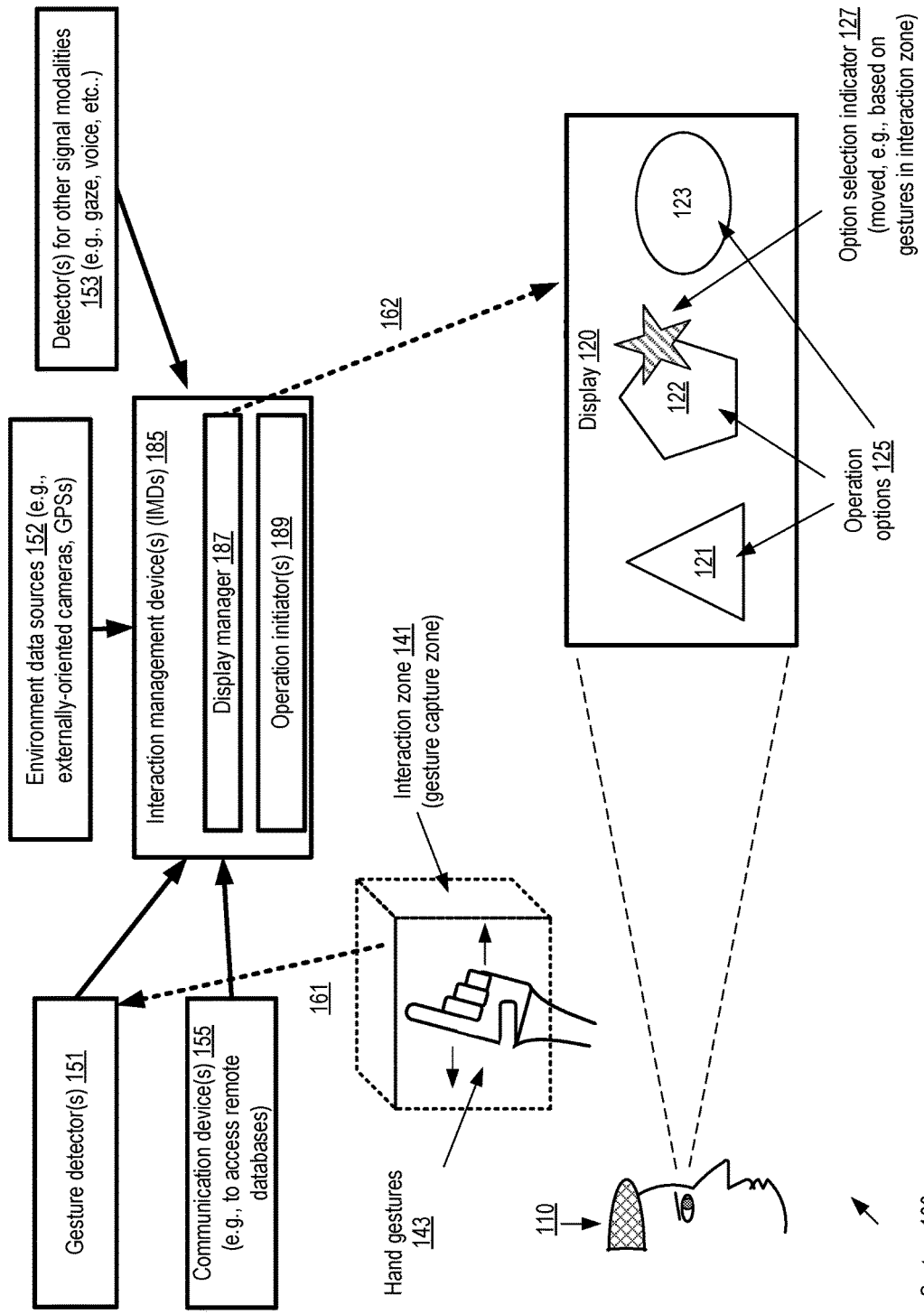
FIG. 1 illustrates an example system environment in which operations such as trajectory changes of an autonomous vehicle may be guided at least in part via gestures, according to at least some embodiments.

FIG. 1 illustrates an example system environment in which operations such as trajectory changes of an autonomous vehicle may be guided at least in part via gestures, according to at least some embodiments. As shown, system 100 may comprise several types of signal detectors for detecting human movements and other human behaviors, including one or more gesture detectors 151 as well as detectors 153 for other signal modalities such as gaze or voice. Individual ones of the signal detectors may comprise, for example, respective sensor devices (e.g., video and/or still cameras in the case of the gaze detectors and gesture detectors, microphones in the case of voice detectors and the like). For some types of signals including gestures, a variety of additional sources may be used in different embodiments such as depth cameras, inertial sensors, electromagnetic signal detectors, ultrasonic signal detectors, radar signal detectors and the like. For gaze detection, in addition to still or video cameras, non-camera-based optical sensors or EMG (electromyography) sensors may be used in some embodiments.

In the depicted embodiment, a three-dimensional interaction zone 141 may be defined, within which gestures such as various types of hand movements 143 may be detected and interpreted with respect to an individual 110's intentions or goals regarding a variety of possible types of operations. For example, in at least some embodiments, individual 110 may be an occupant of an autonomous or semi-autonomous vehicle, and gestures made within the interaction zone may be used to initiate sessions of interactions with components responsible for the vehicle's trajectory, to select from among possible options related to the vehicle's trajectory, and/or to terminate such interaction sessions. The interaction zone may also be referred to as a gesture capture zone. Signals corresponding to other modalities, such as gaze or voice, may also be used during such interaction sessions in at least some embodiments, e.g., to confirm or approve a selected option, to indicate that the current set of identified candidate options should be re-generated or replaced, and so on. The different types of signals (e.g., gestures versus gaze versus voice) may be referred to as respective signaling modes or signal modalities, and the analysis of combination of signals of different modalities from an individual to gauge the individual's preferences regarding various options may be referred to as multimodal signal analysis; as such, systems similar to those shown in FIG. 1 may also be referred to as multimodal signal analysis systems.

In the depicted embodiment, one or more interaction management devices (IMDs) 185, which may be implemented using one or more computing devices, may determine that a triggering condition for starting an interaction session with individual 110 has been met. The interaction management devices 185 may, for example, determine based at least in part on data collected by gesture detector(s) 151 that (a) a portion of a limb or extremity (e.g., a hand) of the occupant has entered the interaction zone, (b) a portion of a limb or extremity of the occupant has remained within the interaction zone for a threshold time interval, and/or (c) that a specific gesture which has been designated as a session initiation signal has been made by the occupant within the interaction zone. In some embodiments, the boundaries of the interaction zone may be customizable—e.g., if the individual 110 is tall, an interaction zone at one height may be used, and if the individual is short, the interaction zone may be located at a different height. The boundaries of the interaction zone may be dynamically modified in some implementations—e.g., if a particular gesture happens to extend slightly beyond a currently-defined interaction zone's boundary in one dimension, the gesture may still be detected and analyzed despite the crossing of the boundary. In some embodiments, the triggering condition may be met as a result of a voice command issued by the individual 110, a change in a direction of a gaze of individual 110, or a body movement (e.g., a movement of the head, neck or torso) of the individual 110.

In various embodiments, a set of one or more options for operations of potential interest to individual 110 may be identified by the IMDs 185. In the case where the individual 110 is an occupant of a vehicle, for example, such operations may include accelerating or decelerating the vehicle, starting movement of the vehicle if the vehicle is in a stationary position, passing a vehicle on the right or on the left, changing lanes, parking the car in a selected parking lot or parking space, turning the vehicle, generating a signal detectable outside the vehicle (such as an audible signal via a horn, or a blinking of a turn signal), and so on. In an embodiment in which the individual 110 is in a room of a building, examples of operations may including ordering a particular item such as a pizza, starting playback or streaming of a motion picture or television program, adjusting the temperature in the room using a thermostat or fan, and so on. Identifying the set of options which may be of interest to the individual, and which can be initiated by the IMDs, may in general present a non-trivial computational problem, especially in the context of a moving vehicle. Algorithms for object recognition, map database analysis, cultural and temporal context analysis, analysis of the personal profiles of the individuals involved, and so on, may be involved in various embodiments. In some embodiments the IMDs may comprise a distributed set of computing devices, e.g., with some of the computations potentially performed at remote locations relative to individual 110 and some of the computations being performed nearby.

In the depicted embodiment, a display 120 may be populated with respective representations of one or more of the options. A number of different kinds of displays 120, such as a heads-up display attached to or incorporated within a vehicle occupied by the individual, or a display incorporated within a wearable device such as augmented reality (AR) or virtual reality (VR) headsets or eyeglasses may be used in various embodiments. In some cases, a display of a portable computing device such as a smart phone, a tablet device, or a laptop may be used, or some other LCD/LED display such as a television screen may be used. A 3-D display may be employed in at least one implementation. Multiple displays may be used concurrently in at least one embodiment. Generally speaking, in various embodiments, the displays may be designed or selected to minimize the effort (such as effort associated with changing gaze direction or head movements) required to view them. For example, if the individual is an occupant of a vehicle and is sitting facing the windshield and usually looking out through the windshield, the display may appear to be incorporated within the windshield, in front of the windshield, or behind the windshield, so that the individual can see the contents of the display without changing head position or gaze direction.

In at least one embodiment, the IMDs 185 and/or other devices configured to collaborate with the IMDs may generate a plurality of options which could be indicated on the display (e.g., by a display manager component 187 of an IMD 185), from which a subset of options may be selected for the display at a given point in time. For example, in the case where the individual 110 occupies a vehicle, some number of options may be identified based at least in part on analysis of data collected from one or more environment data sources 152 (such as externally-oriented cameras, Global Positioning System or GPS devices, etc.) regarding the current position and surroundings of the vehicle. In some embodiments, communication devices 155 (which may for example use telephony or wireless signals) may be used to obtain information from remote databases (such as information about products which may be sold at a particular store nearby, or the menu of a nearby restaurant, which may be of interest to individual 110) which may be used to identify one or more options to be displayed. The maximum number of operation options 125 whose respective representations can be displayed may be determined by the IMDs 185 based on various factors, such as the size of the display, specified preferences of the individual 110, and/or guidelines based on human psychology (such as guidelines which indicate that providing more than N options, especially if a decision is to be made fairly quickly, may be counterproductive). In various embodiments, respective interest scores may be assigned to the options to rank the options relative to one another, as discussed below in further detail with respect to FIG. 7, and the highest-scoring N options may be included in the display 120. In some embodiments, possible options which could be indicated via a display 120 may be identified (e.g., periodically or near-continuously as a vehicle occupied by the individual moves and the external environment changes) prior to the initiation of an interaction session. In one such embodiment, the options may be shown in de-emphasized or background mode (e.g., greyed-out) on display 120 prior to the start of the session, and shown in foreground or enhanced mode during the session.

From among the options presented (e.g., options 121, 122 and 123 shown by way of example on display 120), the individual 110 may select one for implementation of the corresponding operations in the depicted embodiment. An option selection indicator 127 may be moved from one displayed option to another on behalf of the individual 110, e.g., based on hand gestures 143 made within the interaction zone 141 by the individual. For example, as discussed below, in some embodiments the individual 110 may "swipe" a hand or a finger to the left within the interaction zone 141 to cause the indicator 127 to be moved towards the left, or to the right to cause the indicator 127 to be moved towards the right. The particular option at or near which the indicator is eventually positioned as a result of the signals received from the individual may represent the option whose operations are to be implemented. A wide variety of selection indicators 127 may be used in different embodiments, such as images or icons similar to the star-shaped icon shown in FIG. 1, highlighting (e.g., by indicating a spotlight), changing colors (e.g., showing the selected option in green while others are shown in grey), bringing the selected option's representation into sharper focus on the display than the representation of other options, showing a text string such as "selected" or "OK" near or on the representation of the option, etc.

In one embodiment, after the individual has selected an option, and the indication of the selected option has been provided to the individual, an additional interaction to confirm the choice may occur. For example, another gesture may be made within the interaction zone to indicate the individual's approval of the option, or a vocal confirmation may be issued by the individual. In other embodiments, such an additional approval interaction may not be required. The IMDs 185 may cause one or more operations corresponding to the selected option to be initiated. For example, in the vehicle scenario, one or more directives or commands may be transmitted by an operation initiator subcomponent 189 of an IMD to vehicle motion control subsystems such as the braking subsystem, acceleration subsystem, turning subsystem, etc., to cause the vehicle to change its trajectory or speed. In at least one embodiment, the interaction session may be explicitly terminated by the individual 110, e.g., using another hand gesture 143 or some other signal. In other embodiments, interaction sessions may be terminated implicitly, e.g., if no gestures 143 are made by the individual in the interaction zone during some time interval, or if the journey of the vehicle occupied by the individual 110 ends. After the session is terminated, in some embodiments detailed monitoring of at least some of the signals generated by the individual (including, for example, gestures 143) may be discontinued for at least some time (except, for example, monitoring for new session initiation signals).

Signal modalities other than (or in addition to) gestures may be used for various phases of the interactions described above in at least some embodiments. For example, in one embodiment interaction sessions may be started (and/or terminated) using voice commands, gaze direction changes, and so on. The other modalities may be used for option selection and/or approval/confirmation in some embodiments. In one embodiment, the options may be indicated to the individual using audio rather than a visual display. In various embodiments, the IMDs 185 may be configured to utilize any combination of several alternative modalities to determine the operations to be performed—e.g., a different modality may be used to start a session than is used to indicate a selection of an option, or a combination of modalities may be used for one or more of the steps involved in identifying a selected option. One signal modality may be distinguished from another, for example, based on some combination of (a) the particular part of the body which is the source of the signals (e.g., eye versus hand versus vocal system) and/or (b) the techniques and media used to capture and analyze the signals (e.g., capturing physical movements via a video camera, followed by execution of movement analysis algorithms, versus capturing voice signals followed by execution of voice recognition and natural language processing algorithms).

Both gaze and gesture may provide directional information regarding potential operations of interest in various embodiments: for example, the gaze of an individual at a point in time may be represented in some embodiments by a three dimensional vector extending from a point between the individual's eyes, indicating the direction in which the individual was looking (and thereby potentially helping to identify an object or destination of interest, especially when combined with analysis of a gesture). In some embodiments, gaze detectors may capture specific types of eye movements such as smooth pursuit (in which the eye follows a moving visual target), voluntary saccades (in which the eye rapidly moves between fixation points), and/or vergence (in which the angle between the orientation of the two eyes is changed to maintain single binocular vision with respect to a particular set of objects).

In some embodiments, natural language analysis techniques and algorithms may be used, e.g., together with gesture-based analysis, to determine options of interest to and/or selected by individual 110. Although gaze, gesture and voice are the modalities used most frequently as examples in this document, the techniques described herein may be applied to signals corresponding to any desired modalities, and are not restricted to gaze, gesture or voice. In various embodiments, a given signal detector (e.g., gesture detector 151, environment data source 152, or other modality detector 153) may also include hardware and/or software capable of performing at least some initial level of analysis or filtering of the collected signals, buffering of the collected signals, assigning timestamps or other timing indicators to various groups of signals or individual signals, receiving configuration directives or commands associated with the collection, analysis or filtering of signals, as well as transmitting the raw and/or processed signals to one or more destinations. At least some of the signal detectors may store timestamps or other timing information together with the raw signals themselves—e.g., it may be possible using the collected signals to determine the time at which a particular gesture was made, and/or to arrange events such as a head or neck movement (a nod or shake of the head), a torso movement (such as a bend of the body towards or away from some object), a change of gaze direction, and a vocalized signal in temporal order.

In much of the following description, the techniques and algorithms for selecting among various options of interest to an individual using gesture analysis or multimodal analysis are presented in the context of a vehicle (e.g., a moving vehicle) which is occupied by the individual. However, similar techniques and algorithms may be used with equal success in other environments and contexts in various embodiments, such as when the individual is within a room of a building, walking, and so on.

Figure 2:
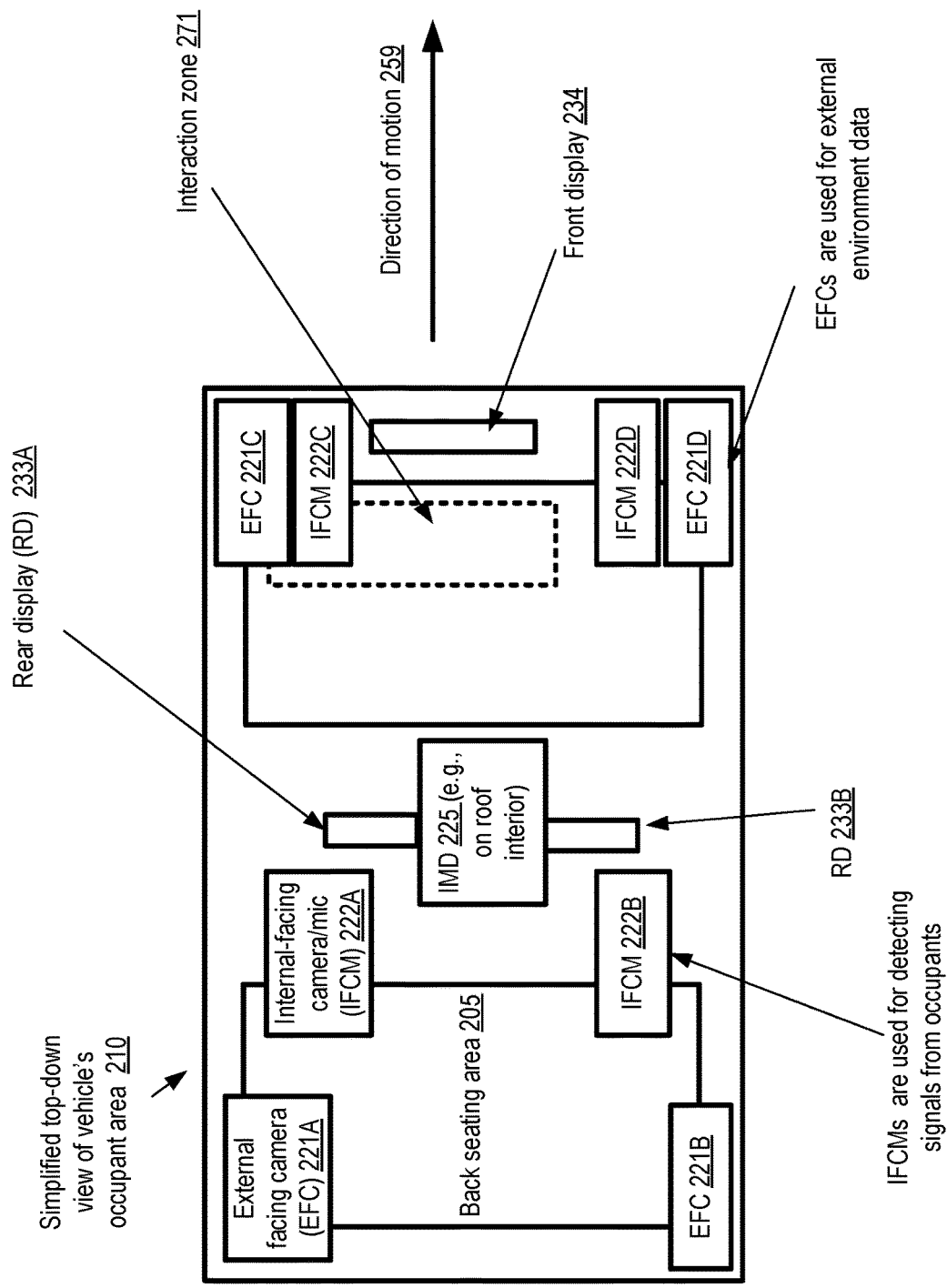
FIG. 2 illustrates an example vehicle environment comprising a plurality of sensors which may collect data that can be analyzed to respond to gestures or other signals from the vehicle's occupants, according to at least some embodiments.

FIG. 2 illustrates an example vehicle environment comprising a plurality of sensors which may collect data that can be analyzed to respond to gestures or other signals from the vehicle's occupants, according to at least some embodiments. A simplified top-down view 210 of the vehicle's occupant area is provided. The vehicle may, for example, comprise a car, truck, golf-cart, all-terrain vehicle, or the like. In at least some embodiments, at least some of the movements of the vehicle may not require direct human control—e.g., the vehicle may be able to park itself automatically, drive under some conditions without being guided by a human, and so on. Objects and regions which may be located at different depths with respect to each other (and may thus be obscured by each other or by other objects) in the vehicle are shown, even though at least some of the objects or regions may not actually be visible simultaneously in a more realistic depiction. As indicated by arrow 259, the vehicle may be moving from left to right in FIG. 2. The vehicle may include two rows of seating areas in the depicted embodiment: front seating area 202 and back seating area 205. For example, in one scenario two occupants may sit in each of the seating areas.

The signal detection components of the vehicle may be designed to capture gesture, gaze and/or voice signals from the occupants, and environmental signals from the exterior of the vehicle. Respective sets of internal-facing cameras and microphones (IFCMs) 222, such as IFCMs 222A-222D, may be configured to capture indications of movements from the occupants. Although four IFCMs are shown, so that respective IFCMs may be used for capturing signals from respective occupants in a four-occupant scenario, the relationship between IFCMs and occupants need not be one-to-one in various embodiments. For example, a single camera and/or a single microphone may be used to collect signals from multiple occupants in some embodiments, and conversely, multiple cameras and/or microphones may be used to capture a single occupant's signals in some conditions. In some cases, the mapping between the IFCMs 222 and the occupants may change with occupancy—e.g., if there are only two occupants during some time period, two IFCMs may be directed towards each of the occupants; later, if two more occupants occupy the vehicle, one IFCM may be directed towards each occupant.

Four external facing cameras (EFCs) 221A-221D may capture the scenes viewable from various parts of the moving vehicle in the depicted embodiment. As with the IFCMs, the relationship between EFCs and occupants need not necessarily be 1:1 in at least some embodiments. A local interaction management device (IMD) 225 may be located in the vehicle of FIG. 2, e.g., attached to the interior roof or below the seats. In some embodiments, the local IMD components 225 may perform at least some of the analysis of the signals collected by the IFCMs and the EFCs to help identify candidate options for operations of interest to occupants of the vehicle. In other embodiments, the local IMD 225 may offload some or all of the signal analysis and interpretation workload to one or more servers at a data center—e.g., the local component may transmit representations of the signals to the servers, receive the results of analyses performed at the servers, and so on. In addition to a front display 234, the vehicle may also include one or more rear displays (RDs), such as RD 233A and 234 in the depicted embodiment. Gestures made by one or more occupants within an interaction zone 271 may be used to initiate/terminate interaction sessions, select among options displayed using front display 234 and/or rear displays 233, approve operations corresponding to a selected option indicated on the displays, and so on. In at least some embodiments, multiple interaction zones 271 may be established within the vehicle, e.g., for respective occupants. Signals collected from several different occupants may be used in some cases to obtain guidance regarding operations to be performed—e.g., gestures or gaze changes of two or more occupants of a vehicle, when analyzed in combination, may provide a clearer indication of a selected option than if signals of only a single occupant were examined in isolation.

Figure 3A:
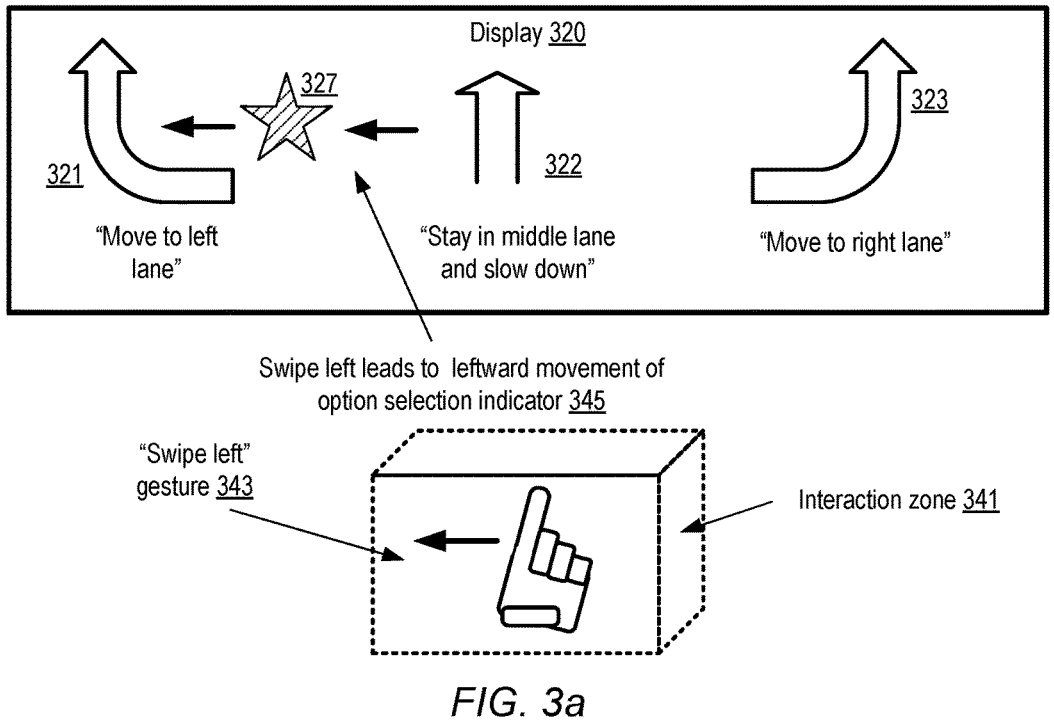
FIG. 3a and FIG. 3b illustrate examples of gestures which may be used to select from among options being displayed for a vehicle's movements, according to at least some embodiments.
Figure 3B:
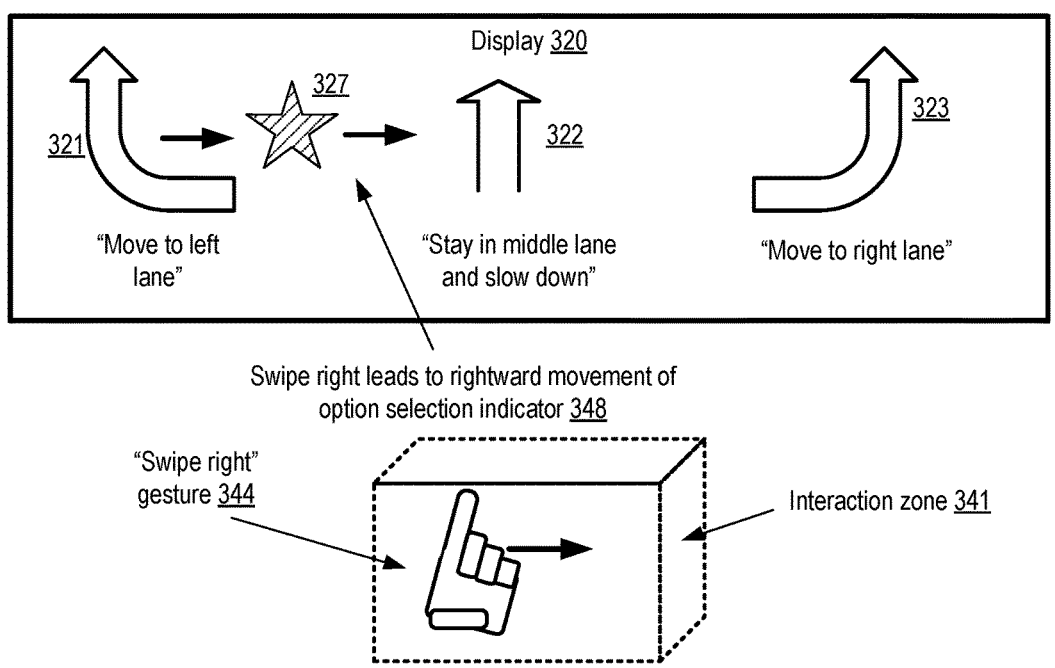

FIG. 3a and FIG. 3b illustrate examples of gestures which may be used to select from among options being displayed for a vehicle's movements, according to at least some embodiments. In FIG. 3a and in FIG. 3b, respective representations of three options are shown within a display 320, along with corresponding text descriptions (the text descriptions need not be included in the display in at least some embodiments, and are shown in FIG. 3a and FIG. 3b to explain the graphic representations of the options). The vehicle is assumed to be in the middle lane of a three-lane highway or road in the depicted examples at the time that the illustrated options are displayed, and the external environment sensors are assumed to have detected the presence of another vehicle (moving at a lower speed than the vehicle in which the display 320 is incorporated) ahead and in the middle lane. Option 321 corresponds to the operations which would cause the vehicle to move to the left lane of the road or highway. Option 322 corresponds to staying in the middle lane and decelerating the vehicle, while option 323 corresponds to moving to the right lane. In at least some embodiments, the representations may provide one or more visual cues in addition to straightforward arrows indicating directions of movement. For example, the length of the arrows representing the different options may indicate relative speed. Thus, the shorter arrow shown for option 322 may indicate deceleration, while the longer arrows for options 321 and 323 may indicate that the current speed may be maintained. In one embodiment, an icon representing the vehicle in front may also be shown with respect to one or more of the options. In the latter scenario, it may become evident that option 321 corresponds not only to moving into the left lane, but also to passing (or at least attempting to pass) the other vehicle.

In the embodiment depicted in FIG. 3a and FIG. 3b, an occupant of the vehicle who is a participant in the interaction session underway may use a "swipe left" gesture 343 to move the selection indicator 327 to the left (FIG. 3a) and a "swipe right" gesture 344 to move the selection indicator to the right (FIG. 3b). Thus, the gesture detector or detectors being used may determine, based on capturing video or still imagery of the occupant's hand within the interaction zone 341, a direction of a displacement of the hand relative to an initial position of the hand, and use that direction of displacement to cause an analogous displacement of the selection indicator 327 (as indicated in labels 345 and 348). The particular option nearest which (or upon which) the indicator 327 comes to rest after the displacement is applied may be designated as the selected option in the depicted embodiment. Additional gestures (or signals of other modalities) may be used to approve or confirm the choice indicated on display 320 in some embodiments—e.g., a "thumbs-up" gesture or a spoken "yes" may be used for such approvals.

Figure 4A:
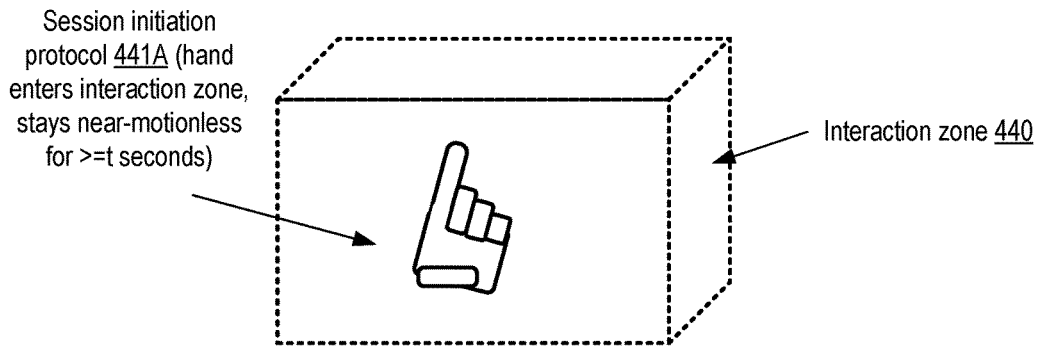
FIG. 4a, FIG. 4b and FIG. 4c illustrate examples of gestures which may be used to initiate and terminate interaction sessions, according to at least some embodiments.
Figure 4B:
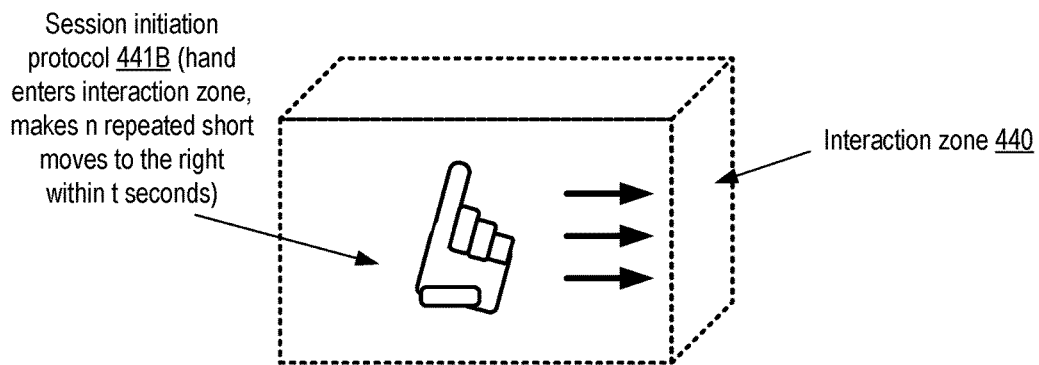
Figure 4C:
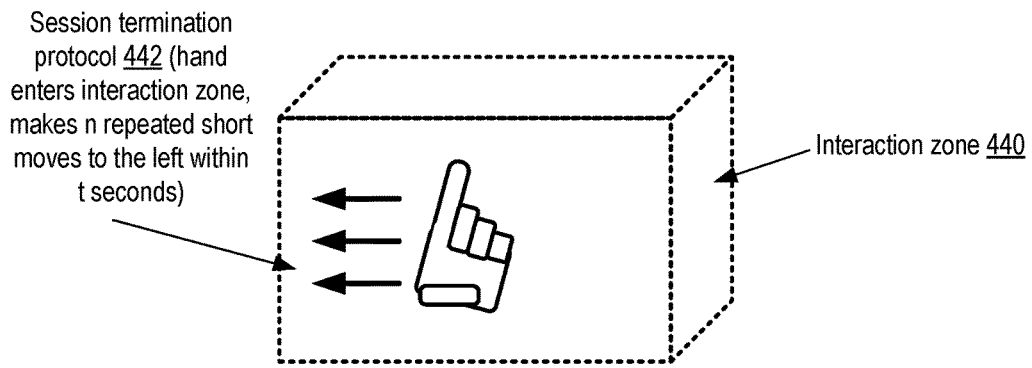

FIG. 4a, FIG. 4b and FIG. 4c illustrates examples of gestures which may be used to initiate and terminate interaction sessions, according to at least some embodiments. In FIG. 4a, according to the session initiation protocol 441A, an interaction session may be initiated by an individual by simply moving a hand into the interaction zone 440, and keeping the hand relatively motionless within the interaction zone for a time period which is no shorter than "t" seconds. In FIG. 4b, according to a different session initiation protocol 441B, "n" repeated short movements of the hand to the right within "t" seconds in the interaction zone 440 may trigger the initiation of an interaction session. After a session is initiated, during the time interval when the session is in progress, the gestures that were used to initiate the session may no longer be interpreted in the same way. Thus, for example, during the course of a session started using the protocol shown in FIG. 4b, "n" repeated short movements of the hand to the right may be interpreted in other ways—e.g., they may instead cause successive displacements of the selection indicator.

FIG. 4c indicates that, according to session termination protocol 442, three short leftwards movements of the hand within interaction zone 440 and a selected time interval would terminate an interaction session. In general, when selecting the kinds of gestures that are used to initiate and terminate interaction sessions, an attempt may be made to select unusual gestures so as to avoid causing interaction sessions to be begun or terminated unintentionally. In some embodiments, a combination of modalities may therefore be used—e.g., a voice command may be used, either alone or in combination with a gesture, to initiate/terminate a session.

As suggested by the examples shown in FIG. 3a-FIG. 4c, a number of different gesture types may be detected and interpreted to display and select options for operations of interest to an individual. In some embodiments, the mappings between gestures (or other signals) and various events (such as interaction session initiation or termination) may be customizable, e.g., on a per-individual basis, and an indication of such mappings may be stored as metadata entries accessible to the interaction management devices.

Figure 5:
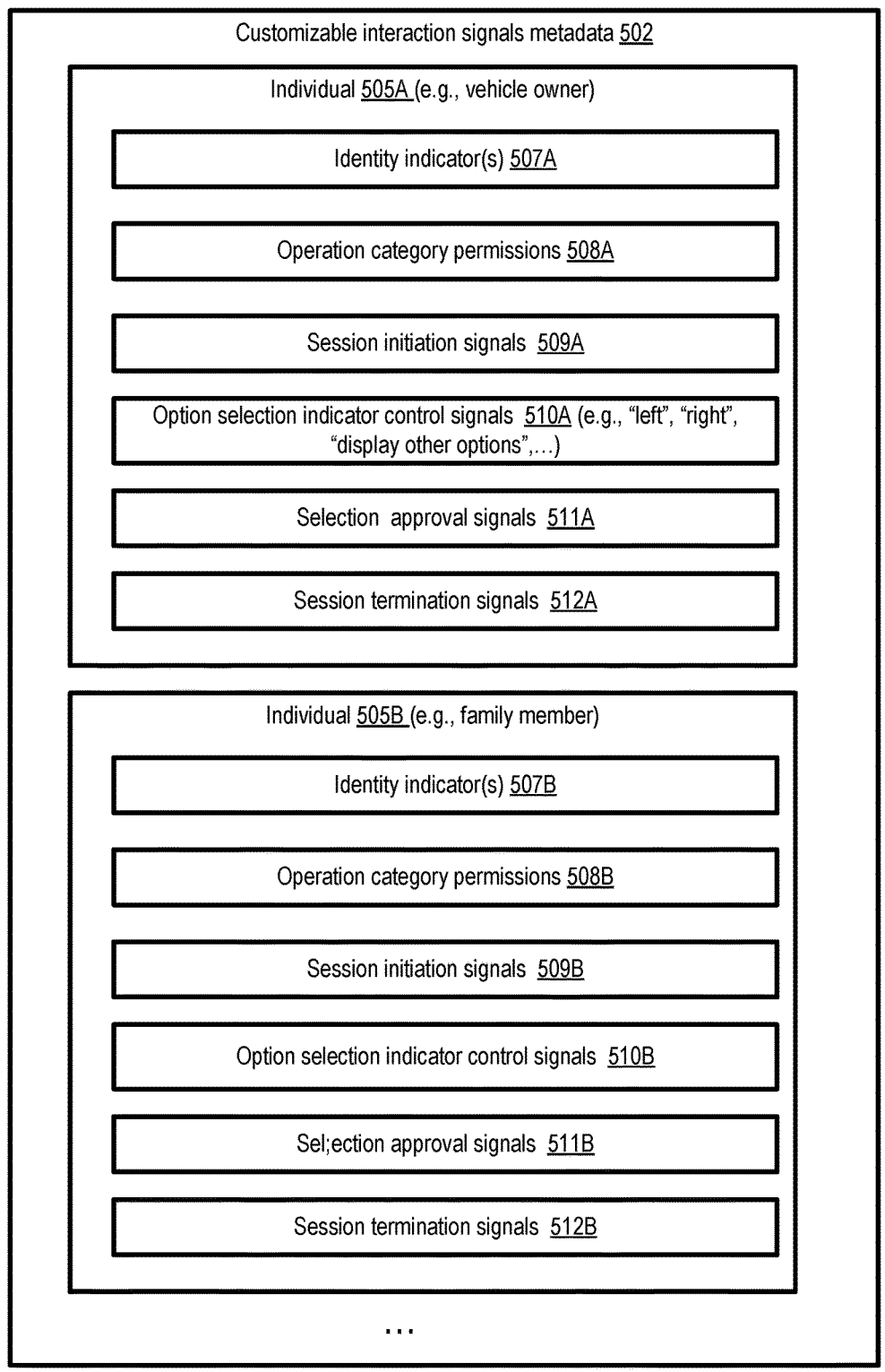
FIG. 5 illustrates example contents of interaction metadata entries, according to at least some embodiments.

FIG. 5 illustrates example contents of interaction metadata entries, according to at least some embodiments. In the depicted embodiment, a respective metadata entry 505 comprising a set of signal mappings and associated settings is shown for two individuals associated with a vehicle (or a set of vehicles) whose operations are to be guided via gestures and/or other similar signals. Entry 505A may correspond to an owner of a particular vehicle equipped with one or more interaction management devices of the kind discussed above, while entry 505B may correspond to a family member of the owner.

A given metadata entry 505 may include, among other elements, identity indicators 507 (e.g., 507A or 507B for the owner and the family member respectively), operation category permissions 508 (e.g., 508A or 508B), session initiation signals 509 (e.g., 509A or 509B), option selection indicator control signals 510 (e.g., 510A or 510B), selection approval signals 511 (e.g., 511A or 511B), and/or session termination signals 512 (e.g., 512A or 512B). Similar entries may be defined for numerous other individuals associated with a given vehicle or a given collection of interaction management device(s) in various embodiments. The contents of the entries may be set, e.g., using configuration tools which may themselves be gesture-driven or driven using selected signal modalities.

The identity indicators 507 may define how (e.g., using one or more biometric indicators, passwords or the like) the interaction management devices are to recognize the individuals on behalf of whom the options for operations are to be displayed, selected and acted upon. The data to be matched (e.g., the biometrics signatures or passwords, which may be voice-based in some implementations) for identity detection may also be stored in the metadata entry 505 in some embodiments. In other embodiments, the data used for identifying the individuals may be stored at a different repository.

Not all the individuals who interact with a given interaction management device may be allowed to initiate the same sets of actions in some embodiments. For example, a child of the owner may be granted a different set of permissions than the owner—while the owner may be permitted to change trajectories of a vehicle, the child may only be permitted to request information about buildings or sites encountered on a journey. The particular types of operations that the interaction management device(s) are to consider and represent on the displays for a given individual may be governed by the operation category permissions 508. In some embodiments, relative priorities may also be assigned to different individuals who may happen to be occupying the vehicle at the same time—e.g., an interaction session of the owner may be granted a higher priority than an interaction session with other occupants. In one embodiment in which priorities are assigned to different individuals, a lower-priority interaction session may not be permitted while a higher-priority session is in progress.

Session inanition signals 509 and termination signals 512, which may be used to start and stop interaction sessions, may be customizable for different individuals in the depicted embodiment. Thus, the owner may use a particular signal or gesture to start a session, while a different signal or gesture may be used by the family member. Option selection indicator control signals 510 may be used to move the indicator (similar to the star-shaped indicator 327 shown in FIG. 3) around the display being used, and/or to select the manner in which selection is to be indicated (e.g., via a particular symbol, via highlighting or focus changes, color coding, and the like). Selection approval signals 511 may indicate if and how, after a particular option has been selected, an individual may indicate or confirm approval of the selection in the depicted embodiment. In one embodiment, the boundaries and/or locations of the interaction zones may also be indicated for respective individuals in their metadata entries 505. It is noted that at least in some embodiments, some of the kinds of metadata entry elements shown in FIG. 5 may not be used. In one embodiment, such metadata may not be used or stored; instead, a pre-defined type of signal or gesture may be used for each of the various kinds of choices discussed.

Figure 6:
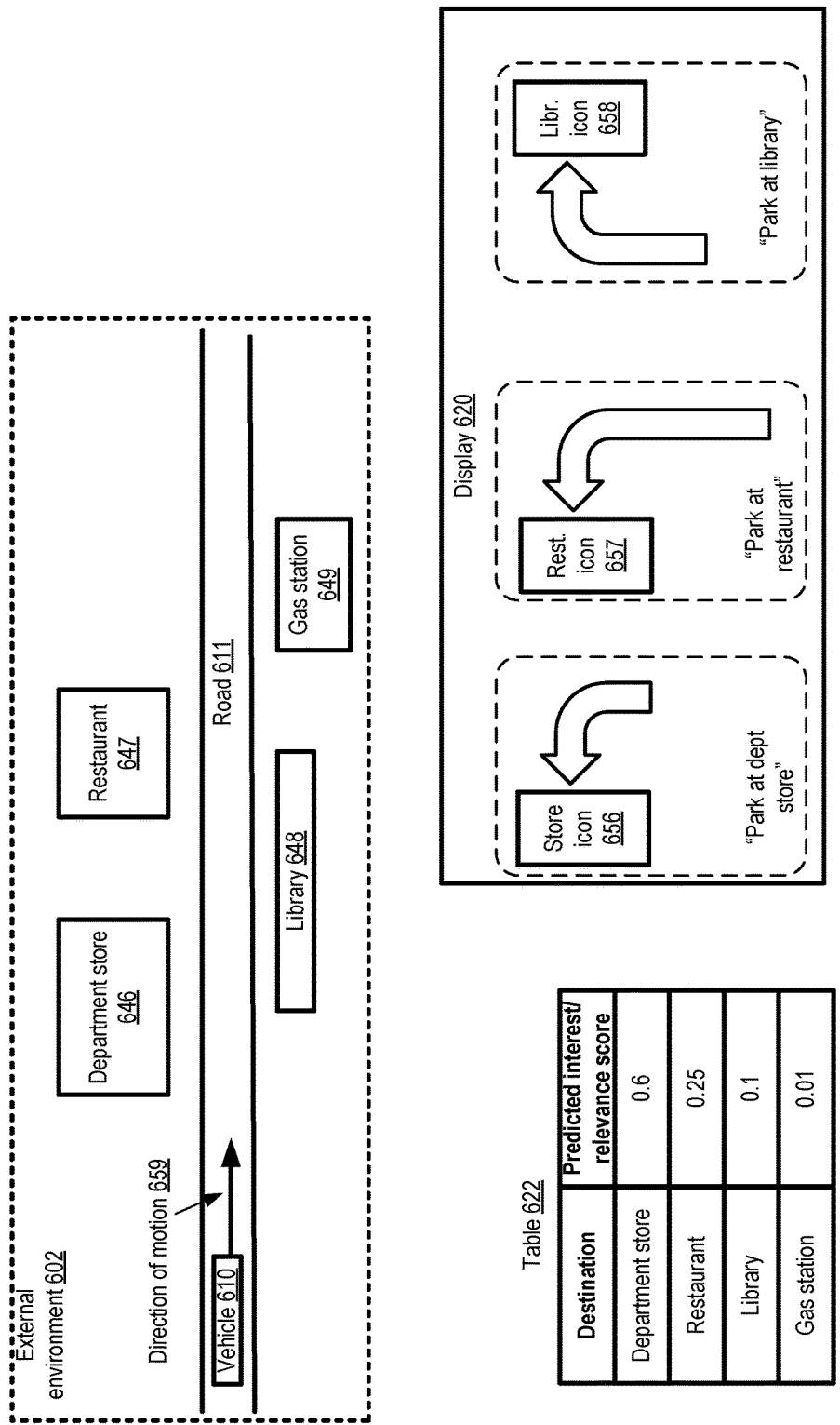
FIG. 6 illustrates an example scenario in which options for vehicle operations may be ranked relative to one another, according to at least some embodiments.

In some embodiments, as mentioned above, a plurality of options for operations may be identified, from among which a subset may have to be selected for displaying at a given time. FIG. 6 illustrates an example scenario in which options for vehicle operations may be ranked relative to one another, according to at least some embodiments. In the depicted embodiment, a vehicle 610 is moving from left to right along road 611. In the external environment 602, four different buildings may be identified: a department store 646 and a restaurant 647 on the left, and a library 648 and gas station 649 on the right. The relative locations of the buildings may be as follows: with respect to the left side, the department store may be nearer than the restaurant, while with respect to the right side, the library may be nearer than the gas station.

The interaction management device(s) of vehicle 610 may be able to identify the four buildings or locations shown as potential destinations for the vehicle, e.g., with the help of data retrieved from a map database, image recognition algorithms, and so on.

As shown in table 622, respective relevance scores or interest scores may be estimated for at least some of the destinations, indicating the likelihoods of each of the destinations being selected by the occupant(s) of vehicle 610. Such interest scores may in some cases be generated using machine learning or artificial intelligence algorithms. The algorithms used may comprise representations of a plurality of rules or heuristics in some embodiments. The scores may then be used to rank destination options relative to one another, and to select a subset of the destinations to be represented in display 620.

In at least some embodiments, contextual information may be analyzed in combination with the multimodal signal data when multiple potential candidate operations or options are identified, and a respective interest/relevance score may be predicted for at least some of the candidates using the contextual information. Any of several different types of context-related information may be used in various embodiments, including for example geographical context, cultural context, conversational context (e.g., the topics which were being discussed in the vehicle prior to the time at which the options are to be identified), or personal profile information of one or more of the individuals involved (which could include a history of previous selections made by the individual, preferences with respect to cuisines, retail outlets, hotels, etc.). Gaze and/or gesture data collected from the occupants may also be used to assign interest/relevance scores in at least some embodiments. In some embodiments, gesture data collected outside the interaction zone may be used to assess the level of interest in a particular destination—e.g., if an occupant of the vehicle 610 appears to point towards the department store 646 and make a positive comment about the store, the relevance score for the store may be set to a higher value.

In the depicted example scenario, the predicted scores lie within a range of 0 to 1, with a higher score indicating a higher predicted probability of the corresponding destination being the intended or preferred destination of the vehicle's occupant(s). The department store 646 may be assigned a relatively high score of 0.6 based on the analysis of the occupants' signals, the occupants' previous history of visiting the store, and so on. The restaurant 647 may be assigned a score of 0.25, e.g., based on the fact that the current time does not correspond to a meal time, and/or using other contextual information such as the culinary preferences of the vehicle occupants. The library 648 may be assigned a lower score of 0.1, while the gas station may be assigned the lowest score of the four destinations (0.01) (e.g., based on determining that the vehicle's gas tank is full or nearly full).

The interactions management device(s) may have determined that at most three options for destinations are to be displayed. Accordingly, based on their relative rankings, options for parking at the department store, the restaurant and the library may be shown on display 620, while the gas station option may not be shown (at least initially) in the depicted embodiment. In at least some embodiments, the relative placement or arrangement of the different options within display 620 may be based at least partly on the relative positions of the corresponding real-world entities. Thus, if an option O1 is generated with respect to an entity E1, an option O2 is generated with respect to a different entity E2, and E1 is positioned to the left of E2 in the real world (as viewed by the occupant of the vehicle), the representation of O1 may be positioned to the left of the representation of O2 within the display being used. In the depicted example, since the store 646 and the restaurant 647 are on the left side of road 611 and the vehicle, the options for parking at the store and the restaurant are shown towards the left of the display 620, while the option for parking at the library is shown at the right of the display 620. Respective icons 656, 657 and 658 may be generated to represent the destinations, while the lengths and directions of the arrows in display 620 may indicate the (approximate, not-necessarily-to-scale) relative distances and directions of the destinations. Since the restaurant is further away than the department store, a longer arrow may be used for the restaurant option than is used for the department store option, for example, and so on. In response to the selection of a particular one of the options displayed (e.g., using some of the kinds of gestures and/or other signals discussed above), the vehicle 610 may be caused to move to, and park near, the building or location corresponding to the selected option.

It may sometimes be the case that the option which the occupants of the vehicle 610 is not displayed (at least initially), e.g., as a result of poor relevance predictions and/or because the interaction management device(s) were not able to identify the appropriate set of options. In some implementations, signals (e.g., specific gestures) may be used by the individuals participating in the interaction session to, in effect, request a new set of options to be displayed, or to request additional information about the displayed options. If an occupant rejects the choices shown in display 620 of FIG. 6, for example, the display may be updated to show an option representing the gas station (and/or other options).

Figure 7:
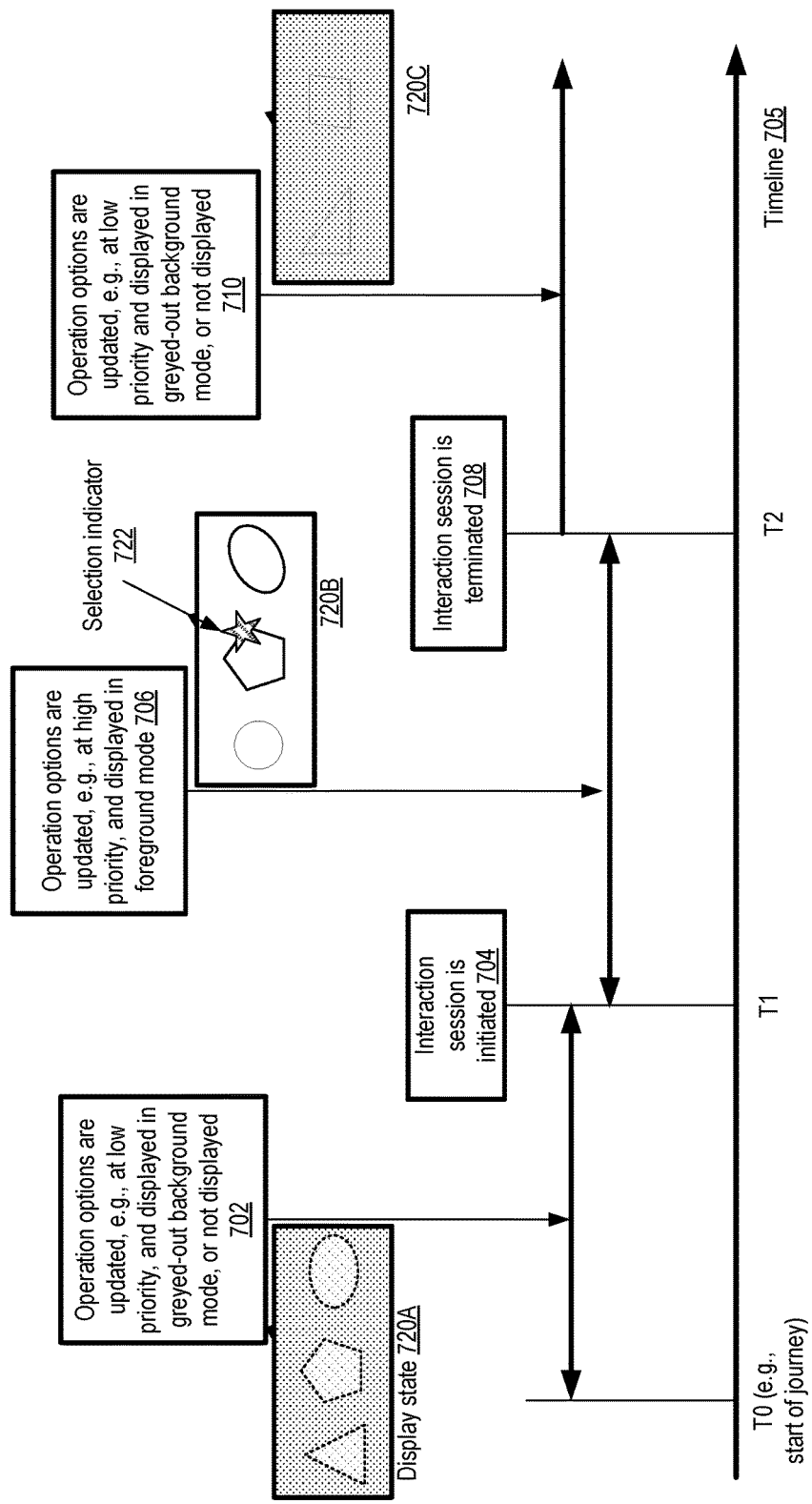
FIG. 7 illustrates an example timeline showing time periods during which options for vehicle operations may be identified even if an interaction session is not underway, according to at least some embodiments.

Depending on the circumstances (e.g., whether interaction sessions are established from within a fast-moving vehicle whose external environment changes rapidly, or whether interaction sessions are established in more static situations), a substantial amount of processing may be required to generate the set of options to be displayed during the interaction sessions. In some embodiments, at least some options for operations potentially of interest to an individual may be identified on an ongoing basis, e.g., regardless of whether a session is established or not, so that the turnaround time taken to start displaying the options if/when a session is established is reduced. FIG. 7 illustrates an example timeline showing time periods during which options for vehicle operations may be identified even if an interaction session is not underway, according to at least some embodiments.

A sequence of events associated with a moving vehicle which includes an interaction management device and sensors of the kinds discussed above is illustrated along timeline 705. At time T0, a particular journey of the vehicle is begun. The first interaction session of the journey with an occupant of the vehicle is initiated at some time T1 after the journey begins, as indicated by element 704. Between T0 and T1, operation options which may be of interest to the occupant are identified and updated (as indicated in element 702), e.g., based on entities or objects detected in the external environment of the vehicle. In some implementations, the processing associated with identifying the options during periods when interaction sessions are not underway may be performed at a relatively low priority—for example, if the computing resources that are used for detecting the options could also be used for other functions, those other functions may be granted more computation cycles, while fewer computation cycles may be devoted to option identification. In other implementations, the priority of the computations for option identification may not change regardless of whether a session is in progress or not. Because a session has not been initiated in the T0-to-T1 time period, the identified options may in some cases be shown in a de-emphasized (e.g., greyed-out) or background mode (as indicated in display state 720A), or the options may not be shown at all. In some embodiments, even if the display continues to be updated, the selection indicator (e.g., the star shaped element 722 shown in display state 720B) may not be shown during time periods when the interaction sessions are not underway. As such, the presence of the selector on the display may indicate that a session is in progress in such embodiments.

After the session is initiated at time T1, the identification of options may continue for the duration of the session, but the manner in which the options are displayed may change. During the interval T1-T2, when the session is in progress, the options may be shown in an enhanced or foreground mode (e.g., not greyed-out), as indicated in display state 720B. The selection indicator may be shown on the display while the session is underway, and may be moved using the kinds of gestures and/or other signals discussed above to cause selected options to be identified and implemented. In at least one scenario, a particular option which was being displayed in background or greyed-out mode prior to the start of the session may be displayed in an enhanced mode after the session begins, if the particular option remains viable. In some embodiments in which option identification processing is performed at a low priority during time periods when sessions are not active, the priority of the processing may be increased during time periods when sessions are in progress.

After the session is terminated, the display may once again transition to a background mode as indicated in display state 720C, although the process of identifying new options may continue. As suggested by the different shapes (and the different number of shapes) shown in display states 720A, 720B and 720C, the set of options may change over time, e.g., as the vehicle moves.

Figure 8:
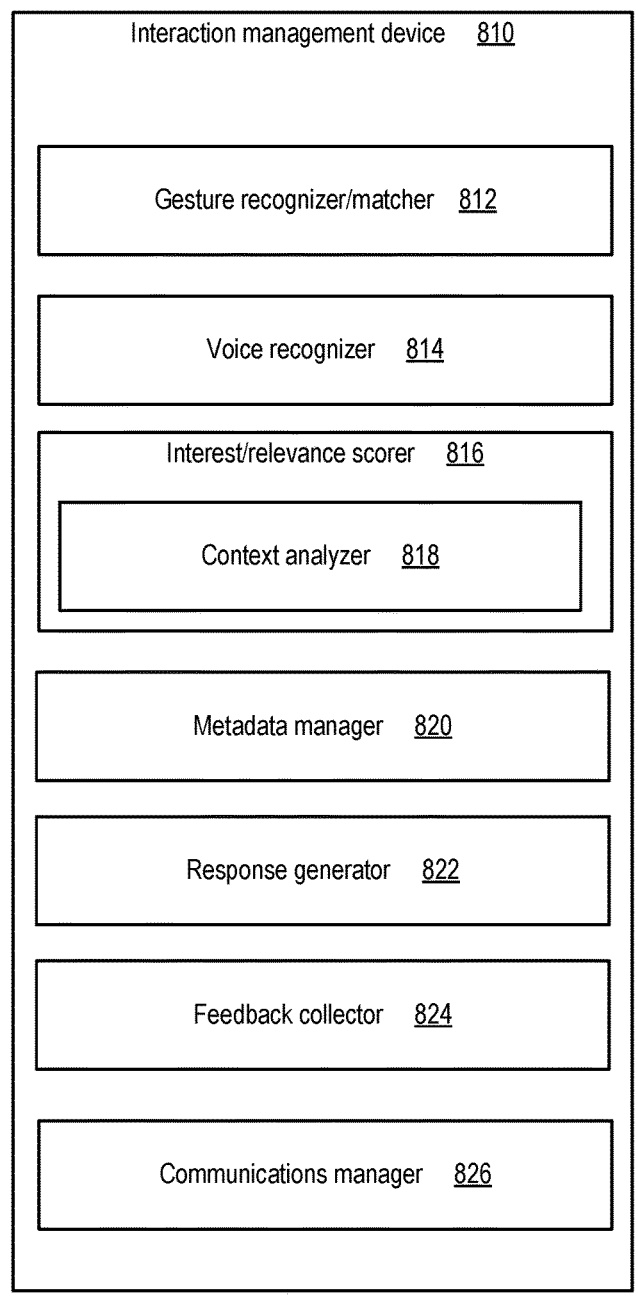
FIG. 8 illustrates example subcomponents of an interaction management device which analyzes multimodal signals to display and select options for operations of interest to one or more individuals, according to at least some embodiments.

FIG. 8 illustrates example subcomponents of an interaction management device which analyzes multimodal signals to display and select options for operations of interest to one or more individuals, according to at least some embodiments. In various embodiments, the functionality of the interaction management device (IMD) may be implemented using a distributed combination of local and remote (with respect to proximity to the individual(s) whose signals are being processed) computing resources. For example, in one embodiment, the gathering of the gesture, gaze and/or voice signals may be performed within a vehicle occupied by the individual, while at least some of the analysis of the signals may be performed at a remote data center to which network connectivity is established from local system components within the vehicle. At least some of the analysis may be performed at local components (e.g., components incorporated within the vehicle occupied by the individual in the above example) in various embodiments.

As shown, the IMD 810 may comprise a gesture recognizer/matcher 812, a voice recognizer 814, an interest/relevance scorer 816, a metadata manager 820, a response generator 822, a feedback collector 824, and/or a communications manager 826 in the depicted embodiment. In some implementations, individual ones of subcomponents of the IMD shown in FIG. 8 may comprise one or more hardware and/or software devices, modules or processes/threads of execution. In at least one embodiment some of the functions of the IMD (such as gesture recognition or object recognition) may involve the use of a separate framework or service—e.g., a machine learning framework which supports convolutional neural network models may be invoked by the IMD 810 for object recognition.

The signals collected from the sensors used for gesture detection (e.g., sensors 151 of FIG. 1 such as still or video cameras) may be provided, in raw or partially processed form, as input to the gesture recognizer/matcher 812 in some embodiments. Metadata indicating how the gestures are to be interpreted or matched may be accessed from metadata manager 820. In some cases, as mentioned earlier, gestures may be used to initiate and terminate sessions. The candidate options for operations of interest may also be identified by matching the kinds of gestures indicated in the metadata to the kinds of gestures made by the individual participating in the session. The voice recognizer 814 may be responsible for determining the content of speech tokens issued by the individual, e.g., using various natural language processing algorithms. In at least some embodiments the voice recognizer 814 may be trained to recognize the speech of specific individuals—e.g., a given voice recognizer, trained on the speech patterns of one individual over some time interval, may be able to distinguish the words spoken by that individual with greater accuracy than words spoken by other individuals.

The interest/relevance scorer 816 may, for example, utilize a context analyzer 818 in the depicted embodiment to arrive at the kinds of scores or rankings shown in FIG. 6 with respect to various candidate options. Context analysis may comprise, for example, determining the topics or objects (if any) that were being discussed prior to (and/or shortly after) a particular iteration of option identification. In at least some embodiments, several different interface types may be available for displaying and selecting options, including for example heads-up displays, touch screens, AR headset displays, and the like. The response generator 822 may choose from among the available interfaces, format representations of the options and the selection indicator appropriately and present the representations via the selected interfaces.

The feedback collector 824 may coordinate the analysis of signals which indicate whether the options were identified quickly enough and/or accurately enough (from the perspective of the individual participating in the interaction session) in the depicted embodiment. In those embodiments in which the analysis of the collected signals is performed in a distributed fashion, a communications manager 826 may be responsible for selecting and utilizing the appropriate communication mechanisms (e.g., wireless communications using telecommunication provider infrastructure, Wi-Fi routers or the like, wired communication via Ethernet or the like) for messages used for the multimodal signal analysis. The communications manager 826 may, for example utilize devices similar to communication devices 155 of FIG. 1. In at least some embodiments, one or more of the subcomponents shown in FIG. 8 may not be employed, or a different set of subcomponents may be utilized by an IMD. Depending on the computational capacity of the local components of the IMDs, a substantial portion of the analysis may be performed at remote components in some embodiments, e.g., at servers located at one or more data centers. At least some of the results of the processing may be transmitted back to the local components or local user interfaces from the remote components, so that the results can be provided to the individuals participating in the interaction sessions.

Figure 9:
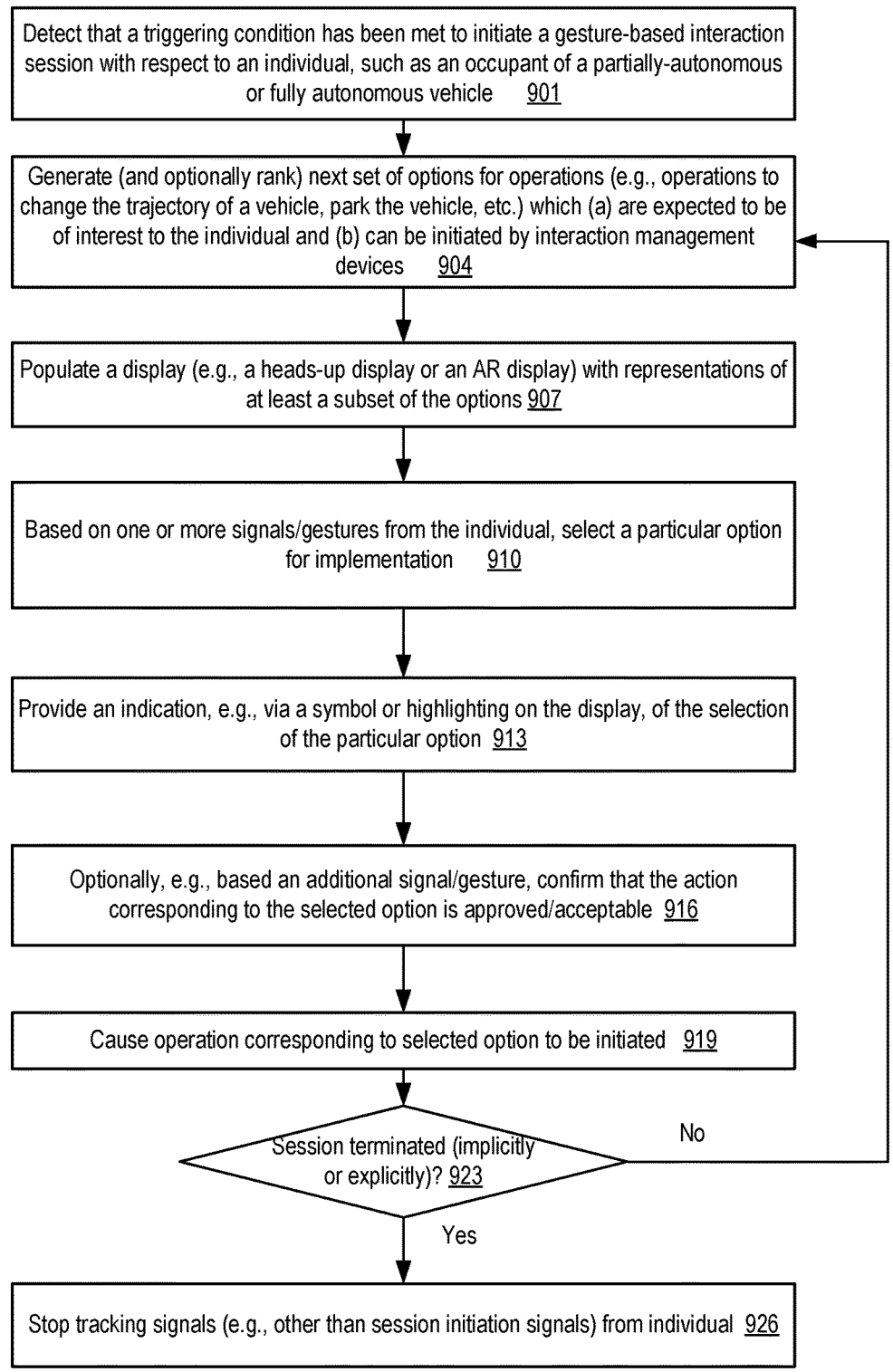
FIG. 9 is a flow diagram illustrating aspects of operations which may be performed at a system which enables gesture-based display and selection of vehicle operation options, according to at least some embodiments.

FIG. 9 is a flow diagram illustrating aspects of operations which may be performed at a system which enables gesture-based display and selection of vehicle operation options, according to at least some embodiments. As shown in element 901, one or more computing devices of the system (such as an interaction management device) may detect that a triggering condition to initiate a gesture-based interaction session with an individual has been met. The individual may, for example, be an occupant of a semi-autonomous or autonomous vehicle. The triggering condition may comprise, for example, a gesture made with a hand within a particular interaction zone, a voiced command, a combination of a gesture and an audible command, and so on in various embodiments. An iterative procedure of identifying, displaying, and acting upon options for operations of interest to the individual may then be begun.

As part of a given iteration, the next set of options for various operations (e.g., operations to change the trajectory of the vehicle occupied by the individual, or to park the vehicle) which may be of interest to the individual, and which can be implemented or initiated by the components of the system, may be identified and/or ranked (element 904).

The options may change depending on the environment—e.g., as the vehicle occupied by the individual moves, new choices for trajectory changes and/or parking spots may be identified. A number of external environment data sources, such as cameras of various kinds, may be used to identify the options in various embodiments. Contextual information, such as a personal profile of the individual, the history of previous operations selected by the individual, the time of day, etc., may also be used in some embodiments to identify and/or rank the options relative to one another.

Representations of at least a subset of the identified options may be used to populate a display (element 907) (such as a heads-up display incorporated within a vehicle, or a display of an augmented reality wearable device). Depending on the number of options identified and/or their relative ranking, some of the identified options may not be shown (at least initially)—e.g., if the display is not large enough to show representations of more than N options, and (N+k) options were identified, a subset of N options may be selected for inclusion in the display.

Based on one or more signals/gestures from the individual, a particular one of the options may be selected for implementation (element 910). For example, the individual may use a swipe or other similar gestures within an interaction zone to move a selection indicator from one option to another on the display, until the selection indicator is positioned close to or on the option the individual wants to have implemented. An indication that the particular option has in fact been selected may be provided via the display (element 913), e.g., by highlighting the representation of the option or using a special symbol or icon. In some embodiments, an addition step of approving the selection may also optionally be performed, e.g., using an additional gesture or signal (element 916). The interaction management system or device may cause one or more operations corresponding to the selected option to be initiated or performed (element 919) in the depicted embodiment.

In various embodiments, the interaction session may be terminated by the individual, e.g., using a gesture-based termination protocol similar to that discussed earlier in the context of FIG. 4. Sessions may also be terminated implicitly, e.g., when a destination of a journey of the vehicle occupied by the individual is reached. If and when the session is terminated, either explicitly or implicitly, which may be detected in operations corresponding to element 922, the system may stop tracking (at least temporarily) signals/gestures from the individual except for session initiation signals (element 925). If the session has not been terminated, the next iteration of option identification, display, selection and implementation may be begun, and operations corresponding to elements 904 onwards may be repeated.

It is noted that in various embodiments, at least some operations other than those illustrated in the flow diagram of FIG. 9 may be used to implement the interaction management techniques involving gestures and/or multimodal signal analysis described above. Some of the operations shown may not be implemented in some embodiments or may be implemented in a different order, or in parallel rather than sequentially.

Figure 10:
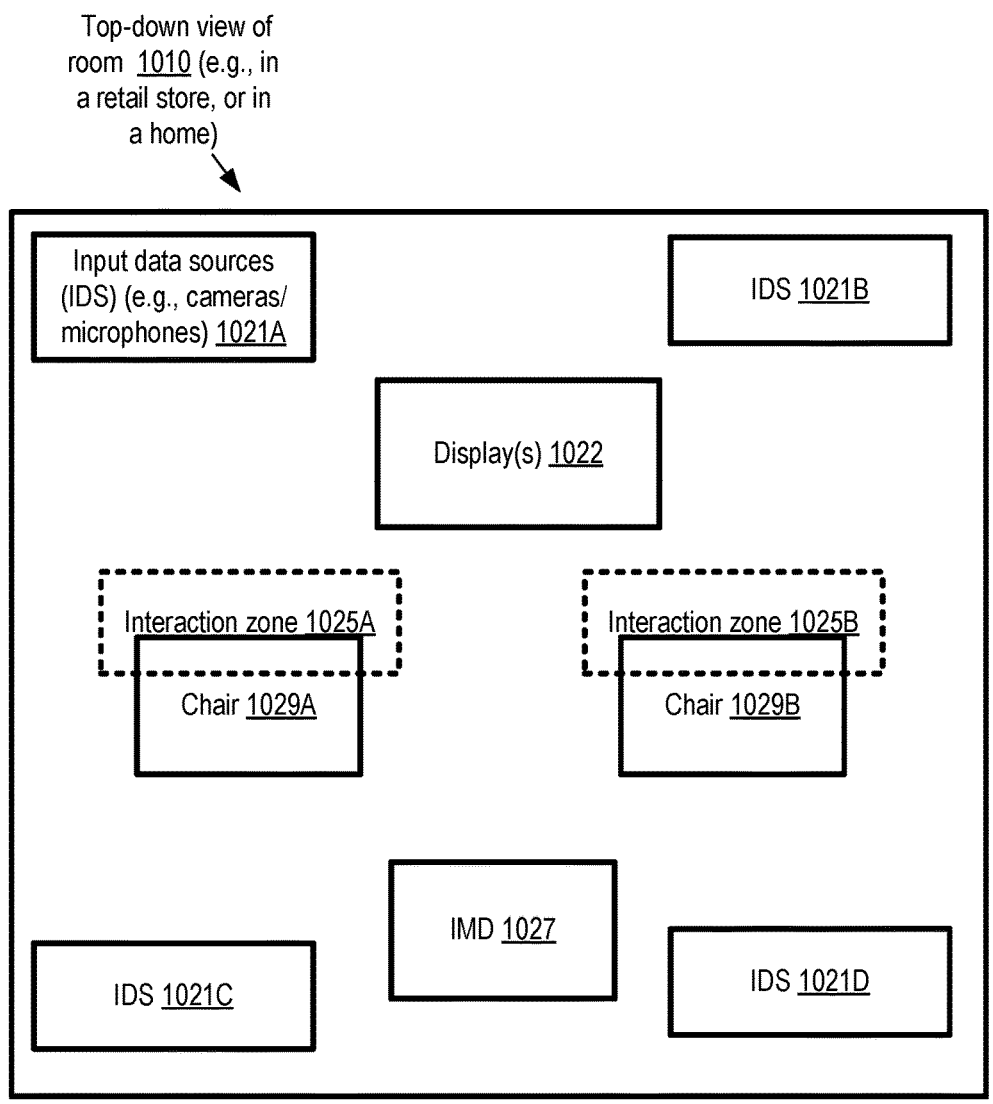
FIG. 10 illustrates an example scenario in which gesture-based display and selection of operations may be performed within a room of a building, according to at least some embodiments.

Generally speaking, the techniques and algorithms for gesture-based interaction management described above may be used with equal success within moving environments (as in the case of a vehicle such as that shown in FIG. 2) as well as stationary environments. FIG. 10 illustrates an example scenario in which gesture-based display and selection of operations may be performed within a room of a building, according to at least some embodiments. A top-down view of a room 1010 (such as a retail store or a room within an individual's home) is shown. Objects not directly relevant to performing multimodal signal analysis, such as furniture in the case of a living room, or products stocked in a retail store, are not shown in FIG. 10. The room 1010 may comprise a plurality of input data sources (IDSs) 1021A-1021B, such as a variety of cameras, microphones and the like. Signals corresponding to several different modalities of the kinds discussed above, such as hand or body gestures, gaze, voice, etc., may be captured from one or more individuals present in the room using some combination of IDSs 1021 in the depicted embodiment. The individuals themselves may be stationary (e.g., seated on chairs 1029A or 1029B), or may be moving (e.g., walking from one part of the room to another). In some embodiments, at least some of the input data sources may be movable (e.g., the orientation of a camera's lens or a microphone may be modified to more clearly capture signals from an individual who may be moving within the room). A number of interaction zones 1025 (e.g., respective regions of three-dimensional space within which gestures made by the individuals are interpreted with respect to identifying and displaying options for operations) may be defined within room 1010, such as zones 1025A and 1025B which may be reached reasonably comfortably by individuals seated in chairs 1029A and 1029B.

Based on one or more gestures by individuals within an interaction zone 1025, and/or based on signals of other modalities, an IMD (interaction management device) 1027 may detect that an interaction session is to be initiated in the depicted environment. A set of options for various operations (such as ordering food from a particular restaurant, starting the presentation of a motion picture or television program, changing a thermostat setting, etc.) may be identified based on various factors, such as an analysis of the discussions being held, the time of day, the history of operations selected by the individuals, the external environment, and so on. Representations of at least some of the options may be provided via display(s) 1022. The individual(s) participating in the session may use gestures or other signals to indicate the selected option, and a visual indication of the selection may be provided. In some cases the individual(s) may approve the selected option after its selection is indicated. One or more actions or operations corresponding to the selected option may then be initiated by the IMD 1027. Additional iterations of option identification, display, selection and implementation may follow, until the session is terminated.

Figure 11:
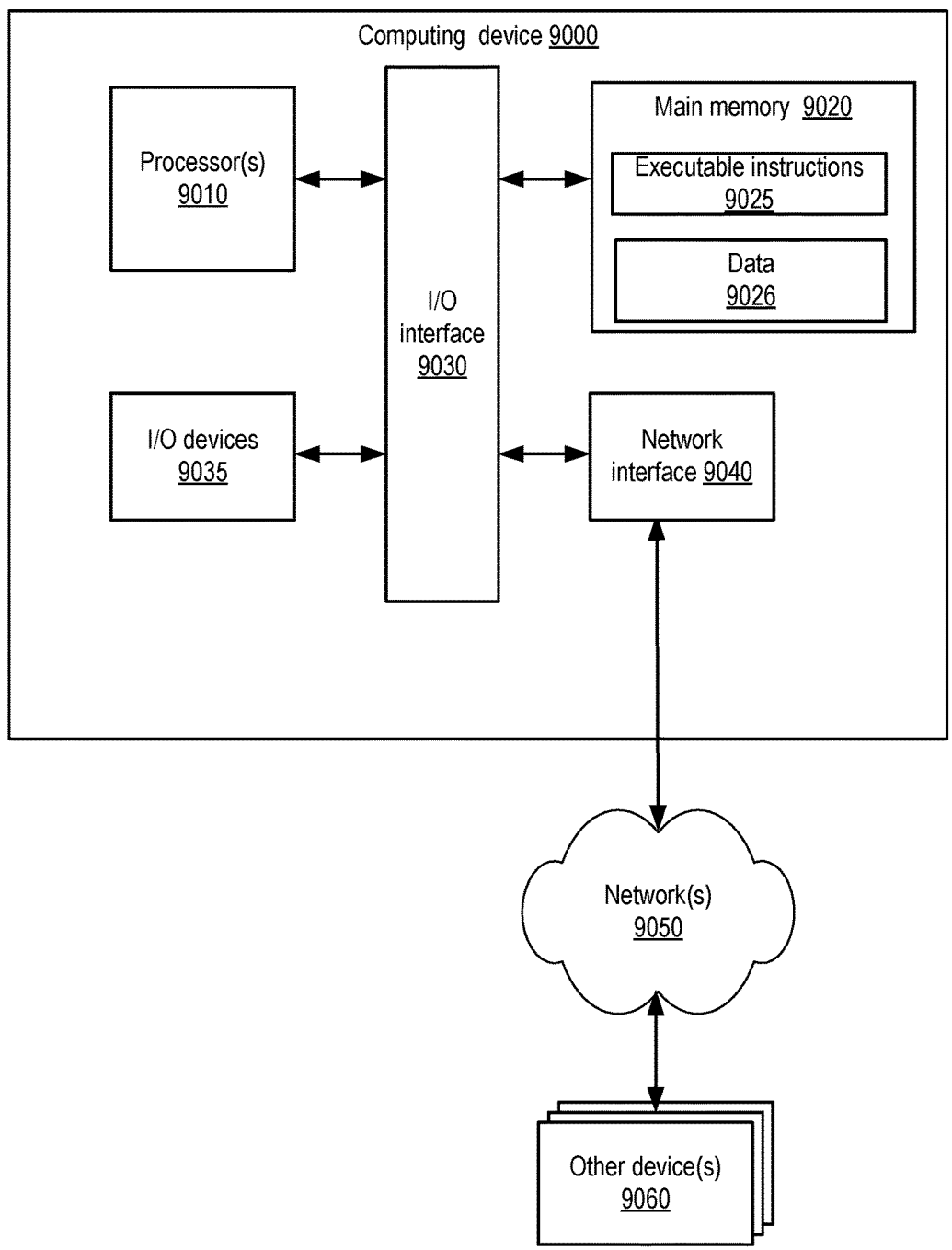
FIG. 11 is a block diagram illustrating an example computing device that may be used in at least some embodiments.

In at least some embodiments, a server that implements a portion or all of one or more of the technologies described herein, including the techniques to collect, obtain or process signals of various types (including gesture, gaze, or voice signals emanating from individuals as well as signals indicative of the individuals' external environment) and perform corresponding actions (such as changing contents of various displays and initiating operations based on selected options), may include a general-purpose computer system that includes or is configured to access one or more computer-accessible media. FIG. 11 illustrates such a general-purpose computing device 9000. In the illustrated embodiment, computing device 9000 includes one or more processors 9010 coupled to a main memory 9020 (which may comprise both non-volatile and volatile memory modules, and may also be referred to as system memory) via an input/output (I/O) interface 9030. Computing device 9000 further includes a network interface 9040 coupled to I/O interface 9030, as well as additional I/O devices 9035 which may include sensors of various types.

In various embodiments, computing device 9000 may be a uniprocessor system including one processor 9010, or a multiprocessor system including several processors 9010 (e.g., two, four, eight, or another suitable number). Processors 9010 may be any suitable processors capable of executing instructions. For example, in various embodiments, processors 9010 may be general-purpose or embedded processors implementing any of a variety of instruction set architectures (ISAs), such as the x86, PowerPC, SPARC, or MIPS ISAs, or any other suitable ISA. In multiprocessor systems, each of processors 9010 may commonly, but not necessarily, implement the same ISA. In some implementations, graphics processing units (GPUs) may be used instead of, or in addition to, conventional processors.

Memory 9020 may be configured to store instructions and data accessible by processor(s) 9010. In at least some embodiments, the memory 9020 may comprise both volatile and non-volatile portions; in other embodiments, only volatile memory may be used. In various embodiments, the volatile portion of system memory 9020 may be implemented using any suitable memory technology, such as static random access memory (SRAM), synchronous dynamic RAM or any other type of memory. For the non-volatile portion of system memory (which may comprise one or more NVDIMMs, for example), in some embodiments flash-based memory devices, including NAND-flash devices, may be used. In at least some embodiments, the non-volatile portion of the system memory may include a power source, such as a supercapacitor or other power storage device (e.g., a battery). In various embodiments, memristor based resistive random access memory (ReRAM), three-dimensional NAND technologies, Ferroelectric RAM, magnetoresistive RAM (MRAM), or any of various types of phase change memory (PCM) may be used at least for the non-volatile portion of system memory. In the illustrated embodiment, executable program instructions 9025 and data 1926 implementing one or more desired functions, such as those methods, techniques, and data described above, are shown stored within main memory 9020.

In one embodiment, I/O interface 9030 may be configured to coordinate I/O traffic between processor 9010, main memory 9020, and various peripheral devices, including network interface 9040 or other peripheral interfaces such as various types of persistent and/or volatile storage devices, sensor devices for gaze signal collection, gesture signal collection, external environmental signal collection, voice collection, etc. In some embodiments, I/O interface 9030 may perform any necessary protocol, timing or other data transformations to convert data signals from one component (e.g., main memory 9020) into a format suitable for use by another component (e.g., processor 9010). In some embodiments, I/O interface 9030 may include support for devices attached through various types of peripheral buses, such as a variant of the Peripheral Component Interconnect (PCI) bus standard or the Universal Serial Bus (USB) standard, for example. In some embodiments, the function of I/O interface 9030 may be split into two or more separate components, such as a north bridge and a south bridge, for example. Also, in some embodiments some or all of the functionality of I/O interface 9030, such as an interface to memory 9020, may be incorporated directly into processor 9010.

Network interface 9040 may be configured to allow data to be exchanged between computing device 9000 and other devices 9060 attached to a network or networks 9050, such as other computer systems or devices as illustrated in FIG. 1 through FIG. 10, for example. In various embodiments, network interface 9040 may support communication via any suitable wired or wireless general data networks, such as types of Ethernet network, for example. Additionally, network interface 9040 may support communication via telecommunications/telephony networks such as analog voice networks or digital fiber communications networks, via storage area networks such as Fibre Channel SANs, or via any other suitable type of network and/or protocol.

In some embodiments, main memory 9020 may be one embodiment of a computer-accessible medium configured to store program instructions and data as described above for FIG. 1 through FIG. 10 for implementing embodiments of the corresponding methods and apparatus. However, in other embodiments, program instructions and/or data may be received, sent or stored upon different types of computer-accessible media. Generally speaking, a computer-accessible medium may include non-transitory storage media or memory media such as magnetic or optical media, e.g., disk or DVD/CD coupled to computing device 9000 via I/O interface 9030. A non-transitory computer-accessible storage medium may also include any volatile or non-volatile media such as RAM (e.g. SDRAM, DDR SDRAM, RDRAM, SRAM, etc.), ROM, etc., that may be included in some embodiments of computing device 9000 as main memory 9020 or another type of memory. Further, a computer-accessible medium may include transmission media or signals such as electrical, electromagnetic, or digital signals, conveyed via a communication medium such as a network and/or a wireless link, such as may be implemented via network interface 9040. Portions or all of multiple computing devices such as that illustrated in FIG. 11 may be used to implement the described functionality in various embodiments; for example, software components running on a variety of different devices and servers may collaborate to provide the functionality. In some embodiments, portions of the described functionality may be implemented using storage devices, network devices, or special-purpose computer systems, in addition to or instead of being implemented using general-purpose computer systems. The term "computing device", as used herein, refers to at least all these types of devices, and is not limited to these types of devices.

CONCLUSION

Various embodiments may further include receiving, sending or storing instructions and/or data implemented in accordance with the foregoing description upon a computer-accessible medium. Generally speaking, a computer-accessible medium may include storage media or memory media such as magnetic or optical media, e.g., disk or DVD/CD-ROM, volatile or non-volatile media such as RAM (e.g. SDRAM, DDR, RDRAM, SRAM, etc.), ROM, etc., as well as transmission media or signals such as electrical, electromagnetic, or digital signals, conveyed via a communication medium such as network and/or a wireless link.

The various methods as illustrated in the figures and described herein represent exemplary embodiments of methods. The methods may be implemented in software, hardware, or a combination thereof. The order of method may be changed, and various elements may be added, reordered, combined, omitted, modified, etc.

Various modifications and changes may be made as would be obvious to a person skilled in the art having the benefit of this disclosure. It is intended to embrace all such modifications and changes and, accordingly, the above description to be regarded in an illustrative rather than a restrictive sense.

What is claimed is:

1. A method, comprising:
performing, using one or more computing devices:
    detecting a gaze or a gesture from an occupant of the vehicle;
    determining relevance scores for individual ones of a plurality of options for operations associated with the vehicle, wherein at least one option of the plurality of options comprises a destination that is determined based at least on:
        the gaze or the gesture being directed from the occupant toward the destination; and
        analysis of one or more signals obtained from the environment external to the vehicle;
    populating a display with representations of the plurality of options for operations associated with the vehicle based at least on the determined relevance scores;
    selecting, based at least on receiving input from the occupant of the vehicle, a particular option of the plurality of options, the input indicative of a voice command and another gesture; and
    causing initiation of an operation corresponding to the particular option.

2. The method as recited in claim 1, further comprising:
detecting that a triggering condition has been met for initiation of an interaction session with respect to the occupant of the vehicle, wherein said detecting that the triggering condition has been met comprises determining one or more of: (a) that at least a portion of a limb of the occupant has entered an interaction zone or (b) that at least a portion of a limb of the occupant has remained within an interaction zone for a threshold time interval.

3. The method as recited in claim 2, wherein said populating is performed subsequent to detecting that a triggering condition has been met for initiation of the interaction session with respect to the occupant of the vehicle, wherein said detecting that the triggering condition has been met comprises detecting one or more of: (a) a voice command, (b) the direction of the gaze, or (c) a body movement of the occupant.

4. The method as recited in claim 2, wherein said populating is performed subsequent to detecting that a triggering condition has been met for initiation of the interaction session with respect to the occupant of the vehicle, the method further comprising performing, by the one or more computing devices:
    identifying at least a first option of the plurality of options prior to detecting that the triggering condition has been met; and
    providing, prior to detecting that the triggering condition has been met, at least a de-emphasized representation of the first option via the display; and
    providing, after detecting that the triggering condition has been met, an enhanced representation of the first option on the display.

5. The method as recited in claim 2, further comprising performing, by the one or more computing devices:
in response to detecting that a triggering condition has been met for termination of the gesture-based interaction session, discontinuing receiving the input from the occupant.

6. The method as recited in claim 1, wherein the display comprises one or more of: (a) a heads-up display incorporated within or attached to the vehicle, (b) a three-dimensional display, (c) a display of a wearable device being worn by the occupant or (d) a display of a portable computing device.

7. The method as recited in claim 1, wherein said analysis of the other gesture comprises identifying a direction of a displacement of a hand of the occupant relative to an initial position of the hand.

8. The method as recited in claim 1, further comprising providing an indication that the particular option has been selected comprising one or more of: (a) highlighting a representation of the particular option on the display, (b) providing an audio message, or (c) displaying a text string.

9. The method as recited in claim 1, wherein the operation corresponding to the selected option comprises one of: (a) passing another vehicle, (b) accelerating the vehicle, (c) decelerating the vehicle, (d) parking the vehicle, (e) changing a direction in which the vehicle is moving, or (f) generating a signal detectable outside the vehicle.

10. A system, comprising:
one or more sensors; and
one or more interaction management devices;
wherein the one or more interaction management devices are configured to:
    detect a gaze or a gesture from an occupant of a vehicle;
    determine relevance scores for individual ones of a plurality of options for operations associated with the vehicle, wherein at least one option of the plurality of options comprises a destination that is determined based at least on:
        the gaze or the gesture being directed from the occupant toward the destination; and
        analysis of one or more signals obtained from the environment external to the vehicle;
    populate a display with representations of a plurality of options for operations associated with the vehicle based at least on the determined relevance scores;
    select, based on receiving input from the occupant of the vehicle, a particular option of the plurality of options, the input indicative of a voice command and another gesture; and
    cause initiation of an operation corresponding to the particular option.

11. The system as recited in claim 10, wherein the one or more interaction management devices are configured to detect, based at least in part on data collected at the one or more sensors, that a triggering condition has been met for initiation of an interaction session with respect to the occupant of the vehicle, wherein to detect that the triggering condition has been met, the one or more interaction management devices are configured to:
    determine one or more of: (a) that at least a portion of a limb of the occupant has entered an interaction zone or (b) that at least a portion of a limb of the occupant has remained within an interaction zone for a threshold time interval.

12. The system as recited in claim 10, wherein the display comprises one or more of: (a) a heads-up display incorporated within or attached to the vehicle, (b) a three-dimensional display, (c) a display of a wearable device being worn by the occupant or (d) a display of a portable computing device.

13. The system as recited in claim 10, wherein the operation corresponding to the particular option comprises one of: (a) passing another vehicle, (b) accelerating the vehicle, (c) decelerating the vehicle, (d) parking the vehicle, (e) changing a direction in which the vehicle is moving, or (f) generating a signal detectable outside the vehicle.

14. The system as recited in claim 10, wherein the one or more interaction management devices are configured to:
   provide an indication that the particular option has been selected; and
   verify, prior to causing the operation corresponding to the particular option to be initiated, that the operation has been approved by the occupant, wherein said verifying is based at least in part on an analysis of one or more signals detected after the indication that the particular option has been selected has been provided.

15. A non-transitory computer-accessible storage medium storing program instructions that when executed on one or more processors:
   detect a gaze or a gesture from an occupant of a vehicle;
   determine relevance scores for individual ones of a plurality of options associated with operations of the vehicle, wherein the plurality of options include one or more destinations determined based at least on the gaze or the gesture being directed from the occupant toward the one or more destinations;
   populate a display with representations of the plurality of options for operations associated with the vehicle based at least on the determined relevance scores;
   select, based at least on receiving input from the occupant of the vehicle, a particular option of the plurality of options, the input indicative of a voice command and another gesture; and
   cause initiation of an operation corresponding to the particular option.

16. The non-transitory computer-accessible storage medium as recited in claim 15, wherein the program instructions when executed on one or more processors detect that a triggering condition has been met for initiation of an interaction session with respect to the occupant of the vehicle, wherein to detect that the triggering condition has been met, the program instructions when executed on the one or more processors:
   determine one or more of: (a) that at least a portion of a limb of the occupant has entered an interaction zone or (b) that at least a portion of a limb of the occupant has remained within an interaction zone for a threshold time interval.

17. The non-transitory computer-accessible storage medium as recited in claim 15, wherein the display comprises one or more of: (a) a heads-up display incorporated within or attached to the vehicle, (b) a three-dimensional display, (c) a display of a wearable device being worn by the occupant or (d) a display of a portable computing device.

18. The non-transitory computer-accessible storage medium as recited in claim 15, wherein the operation corresponding to the selected option comprises one of: (a) passing another vehicle, (b) accelerating the vehicle, (c) decelerating the vehicle, (d) parking the vehicle, (e) changing a direction in which the vehicle is moving, or (f) generating a signal detectable outside the vehicle.

19. The non-transitory computer-accessible storage medium as recited in claim 15, wherein the instructions when executed on the one or more processors:
   provide an indication that the particular option has been selected.

* * * * *